US012790255B2

(12) United States Patent
Immerman et al.

(10) Patent No.: US 12,790,255 B2
(45) Date of Patent: Nov. 10, 2026

(54) METHODS OF MAKING THREE DIMENSIONAL GLASS CERAMIC ARTICLES

(71) Applicant: CORNING INCORPORATED, Corning, NY (US)

(72) Inventors: Jacob Immerman, Corning, NY (US); Rohit Rai, Painted Post, NY (US); John Robert Saltzer, Jr., Beaver Dams, NY (US); Ljerka Ukrainczyk, Ithaca, NY (US); Sibrina Jean Washington, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 557 days.

(21) Appl. No.: 18/096,190

(22) Filed: Jan. 12, 2023

(65) Prior Publication Data

US 2023/0167000 A1 Jun. 1, 2023

Related U.S. Application Data

(62) Division of application No. 16/674,748, filed on Nov. 5, 2019, now Pat. No. 11,554,976.

(Continued)

(51) Int. Cl.

| | |
|---|---|
| ***C03B 32/02*** | (2006.01) |
| ***C03C 10/00*** | (2006.01) |
| ***C03C 21/00*** | (2006.01) |

(52) U.S. Cl.

CPC .......... *C03B 32/02* (2013.01); *C03C 10/0027* (2013.01); *C03C 21/002* (2013.01); *Y10T 428/26* (2015.01)

(58) Field of Classification Search

CPC ..... C03B 23/0013; C03B 23/04; C03B 23/18; C03B 23/26; C03B 32/02

See application file for complete search history.

(56) References Cited

U.S. PATENT DOCUMENTS 3,441,397 A * 4/1969 Sturgill .................. C03B 32/02 65/374.13
10,189,741 B2 1/2019 Beall et al.

(Continued)

FOREIGN PATENT DOCUMENTS

CA 3023600 C * 9/2020 ......... A61C 13/0022
CN 1157268 A 8/1997

(Continued)

OTHER PUBLICATIONS

Chinese Patent Application No. 201980029254.7, Office Action dated May 30, 2022, 4 pages (English translation only), Chinese Patent Office.

(Continued)

*Primary Examiner* — Jodi C Franklin
(74) *Attorney, Agent, or Firm* — Russell S. Magaziner

(57) ABSTRACT

A three dimensional glass ceramic article with a thickness between 0.1 mm and 2 mm, having a dimensional precision control of less than or equal to ±0.1 mm. A method for forming a three dimensional glass ceramic article including placing a nucleated glass article into a mold, and heating the nucleated glass article to a crystallization temperature, where the nucleated glass article is in the mold during the heating. Then, holding the nucleated glass article at the crystallization temperature for a duration sufficient to crystallize the nucleated glass article and form a three dimensional glass ceramic article, where the nucleated glass article is in the mold during the holding, and removing the three dimensional glass ceramic article from the mold.

6 Claims, 17 Drawing Sheets

Related U.S. Application Data

(60) Provisional application No. 62/755,787, filed on Nov. 5, 2018.

(56) References Cited

U.S. PATENT DOCUMENTS

| | | | | |
|---|---|---|---|---|
| 10,562,815 | B1* | 2/2020 | Dai | C03C 10/0054 |
| 10,611,666 | B2 | 4/2020 | Jones et al. | |
| 2001/0056016 | A1* | 12/2001 | Nagata | C03B 32/02 501/63 |
| 2002/0115550 | A1* | 8/2002 | Kawai | C03C 10/0036 501/63 |
| 2003/0198838 | A1* | 10/2003 | Petticrew | A61K 6/17 106/35 |
| 2008/0268295 | A1* | 10/2008 | Yagi | G11B 5/73921 501/63 |
| 2009/0256274 | A1* | 10/2009 | Castillo | C03C 10/0027 264/16 |
| 2010/0083706 | A1* | 4/2010 | Castillo | C03C 4/0021 501/59 |
| 2014/0194270 | A1 | 7/2014 | Shiratori et al. | |
| 2014/0349831 | A1* | 11/2014 | Cornejo | C03C 11/005 501/52 |
| 2014/0357468 | A1* | 12/2014 | Siebers | C03C 3/095 501/32 |
| 2015/0064474 | A1* | 3/2015 | Dejneka | C03C 3/112 501/63 |
| 2015/0099124 | A1* | 4/2015 | Beunet | C03C 10/0054 65/30.14 |
| 2015/0329413 | A1* | 11/2015 | Beall | C03C 3/062 501/63 |
| 2015/0376055 | A1* | 12/2015 | Fu | C03C 21/002 501/32 |
| 2016/0102010 | A1* | 4/2016 | Beall | C03C 21/002 501/4 |
| 2016/0152505 | A1* | 6/2016 | Fushie | C03B 32/02 65/33.1 |
| 2017/0334767 | A1 | 11/2017 | Beall et al. | |
| 2018/0099900 | A1* | 4/2018 | Vollmann | C03C 10/0027 |
| 2018/0244564 | A1* | 8/2018 | Ritzberger | C03C 10/0027 |
| 2018/0327300 | A1* | 11/2018 | Rosenflanz | C03B 32/02 |
| 2019/0062201 | A1* | 2/2019 | Weiss | C03C 3/097 |
| 2019/0169061 | A1* | 6/2019 | Jones | H05K 5/03 |
| 2019/0177210 | A1 | 6/2019 | Beall et al. | |
| 2019/0300426 | A1 | 10/2019 | Fu et al. | |
| 2020/0017393 | A1 | 1/2020 | Hall et al. | |
| 2020/0017395 | A1* | 1/2020 | Click | C03B 32/02 |
| 2020/0055764 | A1 | 2/2020 | Duffy et al. | |

FOREIGN PATENT DOCUMENTS

| | | | | |
|---|---|---|---|---|
| CN | 1495134 | A | 5/2004 | |
| CN | 1689997 | A | 11/2005 | |
| CN | 106167346 | A | 11/2016 | |
| CN | 107902909 | A | 4/2018 | |
| CN | 108483925 | A * | 9/2018 | C03B 11/00 |
| EP | 3514119 | A1 * | 7/2019 | C03B 19/1453 |
| JP | 07-232930 | A | 9/1995 | |
| JP | 11-079785 | A | 3/1999 | |
| JP | 2012-136360 | A | 7/2012 | |
| JP | 2016-037423 | A | 3/2016 | |
| JP | 2017-190265 | A | 10/2017 | |
| JP | 2017-530933 | A | 10/2017 | |
| TW | 201815715 | A | 5/2018 | |
| WO | 2013/011897 | A1 | 1/2013 | |
| WO | 2016/057748 | A1 | 4/2016 | |
| WO | 2017/022355 | A1 | 2/2017 | |
| WO | 2017/223551 | A1 | 12/2017 | |
| WO | 2018/154973 | A1 | 8/2018 | |
| WO | 2019/191358 | A1 | 10/2019 | |
| WO | 2019/199791 | A1 | 10/2019 | |
| WO | 2020/018309 | A2 | 1/2020 | |
| WO | 2020/018393 | A1 | 1/2020 | |
| WO | 2020/041057 | A1 | 2/2020 | |

OTHER PUBLICATIONS

International Search Report and Writien Opinion of the European International Searching Authority; PCT/US2019/059824; Mailed Apr. 17, 2020; 16 Pgs.

Japanese Patent Application No. 2021-524165, Office Action, dated May 11, 2022, 8 pages (4 pages of English Translation and 4 pages of Original Copy); Japanese Patent Office.

Taiwanese Patent Application No. 108140071; Notice of Allowance dated Jan. 19, 2021, 2 Pages (English Translation Only); Taiwanese Patent Office.

* cited by examiner

METHODS OF MAKING THREE DIMENSIONAL GLASS CERAMIC ARTICLES

CROSS-REFERENCE TO RELATED APPLICATIONS

This application is a divisional application and claims the benefit of priority under 35 U.S.C. § 120 of U.S. application Ser. No. 16/674,748 filed on Nov. 5, 2019, which in turn, claims the benefit of and priority to U.S. Provisional Application No. 62/755,787, titled "Methods of Making Three Dimensional Glass Ceramic Articles," filed Nov. 5, 2018, the entire contents of which is hereby incorporated by reference.

BACKGROUND

Field

The present specification generally relates to methods for ceramming glass articles to form three dimensional (3D) glass-ceramics articles and particularly relates to methods for ceramming 3D glass articles to form three dimensional glass-ceramic articles, and articles formed thereby.

Technical Background

There continues to be a demand for transparent covers that can be used in portable electronic devices. Several materials are currently being used as covers for portable electronic devices, such as glass, zirconia, plastics, metals, and glass-ceramics. Benefits of using transparent glass-ceramics include high strength that exceeds strength of ion exchanged glass and high transmissivity, which make glass-ceramics a good choice for optical displays, microwave transmission for full spectrum of antenna frequencies and for electromagnetic charging.

SUMMARY

A first aspect includes a three dimensional glass ceramic article with a thickness between 0.1 mm and 2 mm, comprising a dimensional precision control of less than or equal to ±0.1 mm.

A second aspect includes the three dimensional glass ceramic article of the first aspect, comprising a transmission greater than or equal to 85% in wavelengths from 400 nm to 800 nm, on a sample thickness of 0.8 mm.

A third aspect includes the three dimensional glass ceramic article of any one of first or second aspects, wherein the three dimensional glass ceramic article is strengthened by ion exchange.

A fourth aspect includes the three dimensional glass ceramic article according to any one of the first to third aspects, wherein a haze is less than or equal to 0.40%.

A fifth aspect includes the three dimensional glass ceramic article according to any one of the first to fourth aspects, wherein a birefringence is less than 5.0 nm.

A sixth aspect includes the three dimensional glass ceramic article according to any one of the first to fifth aspects, wherein a deviation in flatness of less than or equal to 0.10 nm.

A seventh aspect includes the three dimensional glass ceramic article according to any one of the first to sixth aspects, wherein the three dimensional glass ceramic article is strengthened and has a compressive stress from greater than or equal to 340 MPa to less than or equal to 400 MPa.

An eighth aspect includes the three dimensional glass ceramic article according to any one of the first to seventh aspects, wherein the three dimensional glass ceramic article is strengthened and has a central tension from greater than or equal to 100 MPa to less than or equal to 150 MPa.

A ninth aspect includes the three dimensional glass ceramic article according to any one of the first to eighth aspects, wherein the three dimensional glass ceramic article is strengthened and has a depth of compression greater than or equal to 0.17*thickness.

A tenth aspect includes method for forming a three dimensional glass ceramic article comprising: placing a nucleated glass article into a mold; heating the nucleated glass article to a crystallization temperature, wherein the nucleated glass article is in the mold during the heating; holding the nucleated glass article at the crystallization temperature for a duration sufficient to crystallize the nucleated glass article and form a three dimensional glass ceramic article, wherein the nucleated glass article is in the mold during the holding; and removing the three dimensional glass ceramic article from the mold.

An eleventh aspect includes the method of the tenth aspect, wherein the nucleated glass article comprises less than or equal to 15% of a crystalline phase when it is placed in the mold.

A twelfth aspect includes the method of any one of the tenth to eleventh aspects, wherein the nucleated glass article comprises less than or equal to 10% of a crystalline phase when it is placed in the mold.

A thirteenth aspect includes the method of any one of the tenth to twelfth aspects, wherein the crystallization temperature is from greater than or equal to 600° C. to less than or equal to 800° C.

A fourteenth aspect includes the method of any one of the tenth to thirteenth aspects, wherein the duration sufficient to crystallize the nucleated glass article and form a three dimensional glass ceramic article is from greater than or equal to 150 seconds to less than or equal to 450 seconds.

A fifteenth aspect includes the method of any one of the tenth to fourteenth aspects, wherein a pressure is applied to the nucleated glass article during at least a portion of at least one of the heating or the holding steps, and the pressure is from greater than or equal to 0.10 MPa to less than or equal to 1.00 MPa.

A sixteenth aspect includes the method of any one of the tenth to fifteenth aspects, wherein the method further comprises cooling the three dimensional glass ceramic article after the holding step.

A seventeenth aspect includes a method for forming a three dimensional glass ceramic article comprising: placing an amorphous glass article into a mold; heating the amorphous glass article to a nucleation temperature, wherein the amorphous glass article is in the mold during the heating; holding the amorphous glass article at the nucleation temperature for a first duration that is sufficient to nucleate the amorphous glass article and form a nucleated three dimensional glass article, wherein the amorphous glass article is in the mold during the holding; heating the nucleated three dimensional glass article to a crystallization temperature, wherein the nucleated three dimensional glass article is in the mold during the heating; holding the nucleated three dimensional glass article at the crystallization temperature for a second duration that is sufficient to crystallize the nucleated glass article and form a three dimensional glass ceramic article, wherein the nucleated three dimensional glass article is in the mold during the holding; and removing the three dimensional glass ceramic article from the mold.

An eighteenth aspect includes the method of the seventeenth aspect, wherein the nucleation temperature is from greater than or equal to 450° C. to less than or equal to 750° C.

A nineteenth aspect includes the method of any one of the seventeenth to eighteenth aspects, wherein the first duration is from greater than or equal to 1.0 hours to less than or equal to 4.0 hours.

A twentieth aspect includes the method of any one of the seventeenth to nineteenth aspects, wherein the crystallization temperature is from greater than or equal to 600° C. to less than or equal to 800° C.

A twenty first aspect includes the method of any one of the seventeenth to twentieth aspects, wherein the second duration is from greater than or equal to 150 seconds to less than or equal to 450 seconds.

A twenty second aspect includes the method of any one of the seventeenth to twenty first aspects, wherein a pressure is applied to the nucleated glass article during at least a portion of at least one of the heating or the holding steps, and the pressure is from greater than or equal to 0.10 MPa to less than or equal to 1.00 MPa.

A twenty third aspect includes the method of any one of the seventeenth to twenty second aspects, wherein the method further comprises cooling the three dimensional glass ceramic article after holding the nucleated three dimensional glass article at the crystallization temperature for a second duration.

A twenty fourth aspect includes a method for forming a three dimensional glass ceramic article comprising: placing an amorphous glass article into a mold; heating the amorphous glass article to a nucleation temperature, wherein the amorphous glass article is in the mold during the heating; holding the amorphous glass article at the nucleation temperature for a duration sufficient to nucleate the amorphous glass article and form a nucleated three dimensional glass article, wherein the amorphous glass article is in the mold during the holding; and removing the nucleated three dimensional glass article from the mold.

A twenty fifth aspect includes the method of the twenty fourth aspect, wherein the nucleation temperature is from greater than or equal to 450° C. to less than or equal to 750° C.

A twenty sixth aspect includes the method of any one of the twenty fourth to twenty fifth aspects, wherein the duration sufficient to nucleate the amorphous glass article and form a nucleated three dimensional glass article is from greater than or equal to 1.0 hours to less than or equal to 4.0 hours.

A twenty seventh aspect includes the method of any one of the twenty fourth to twenty sixth aspects, wherein a pressure is applied to the amorphous glass article during at least a portion of at least one of the heating or the holding steps, and the pressure is from greater than or equal to 0.10 MPa to less than or equal to 1.00 MPa.

A twenty eighth aspect includes the method of any one of the twenty fourth to twenty seventh aspects, wherein the method further comprises cooling the three dimensional glass ceramic article after holding at the nucleation temperature for a duration.

A twenty ninth aspect includes the method of any one of the twenty fourth to twenty eighth aspects, wherein the method further comprises crystallizing the nucleated three dimensional glass article after the nucleated three dimensional glass article is removed from the mold.

Embodiments include a method for forming three dimensional glass ceramic articles comprising: placing an amorphous glass article into a mold; heating the amorphous glass article to a nucleation temperature, wherein the amorphous glass article is in the mold during the heating; holding the amorphous glass article at the nucleation temperature for a duration sufficient to nucleate the amorphous glass article and form a nucleated three dimensional glass article, wherein the amorphous glass article is in the mold during the holding; and removing the nucleated three dimensional glass article from the mold.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1A:
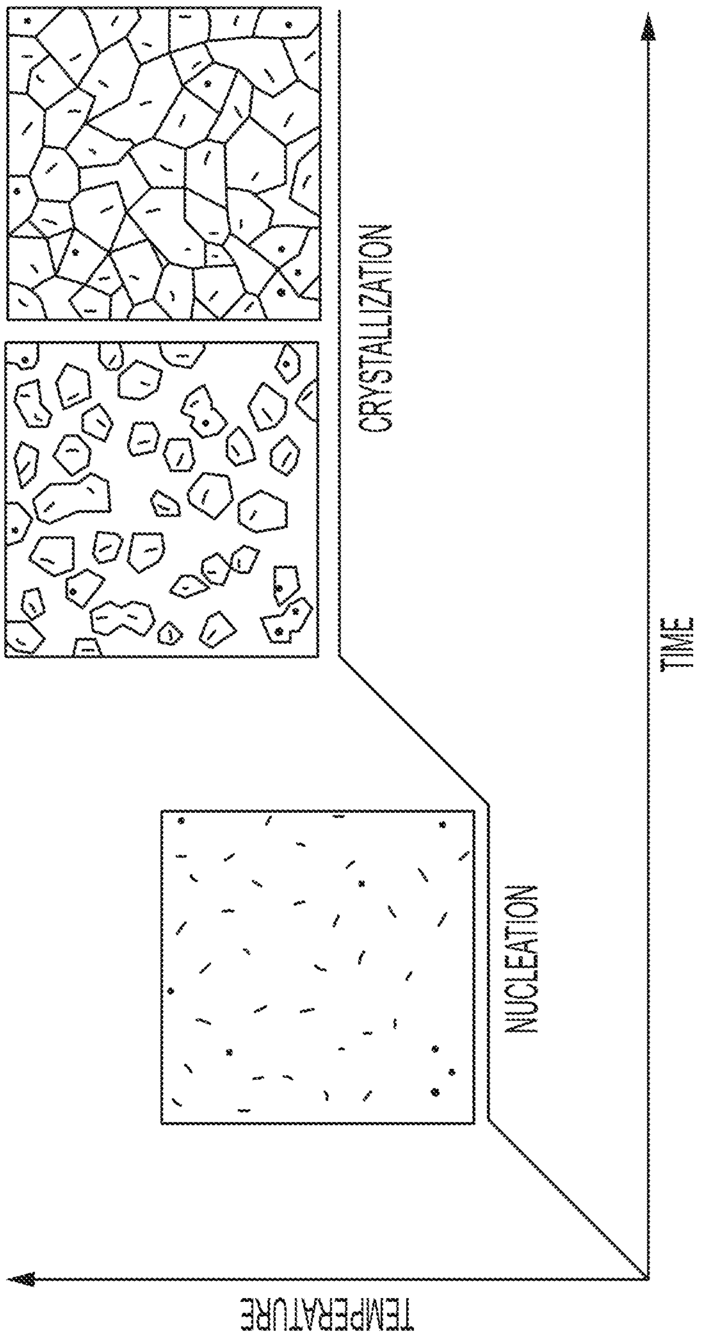
FIG. 1A graphically depicts temperature versus time measurements and nucleation and crystallization (growth) of a ceram cycle according to embodiments disclosed and described herein.

Reference will now be made in detail to embodiments of methods for ceramming three dimensional glass articles, embodiments of which are illustrated in the accompanying drawings. Whenever possible, the same reference numerals will be used throughout the drawings to refer to the same or like parts. In embodiments, a three dimensional glass ceramic article with a thickness between 0.4 mm and 2 mm, comprising a dimensional precision control of less than or equal to ±0.1 mm is provided. Embodiments also include methods for making such three dimensional glass articles.

With reference to FIG. 1A, to form the glass-ceramic, a glass precursor is heated at a temperature above its annealing point for a time sufficient to develop crystal nuclei (also referred to as "nucleation"). The heat treatment can be performed, for example, in a lehr or a furnace. As shown in FIG. 1A, the nucleation process forms small crystal nuclei in the amorphous glass. In this state, the article maintains many of the properties associated with amorphous glass articles and is still sufficiently viscous to be 3D formable. The article may develop about 10% crystalline phase. After being heated above its annealing point, the glass is then further heated, usually at a higher temperature between the glass annealing point and the glass softening point, to develop the crystal phase (also referred to as "growth" or "crystallization"). As shown in FIG. 1A, during the crystallization stage, larger crystals grow around the nuclei—which were formed in the nucleation stage—over time at high temperatures. As the article becomes more and more crystallized (such as when the crystals grow larger and larger), the properties of the article become more and more like a crystalline ceramic and the article is not 3D formable. Many times, the heat treatment, or ceramming process, includes heating the precursor glass to a nucleation temperature, maintaining the nucleation temperature for a predetermined period of time, heating the nucleated glass to a crystallization temperature, and maintaining the crystallization temperature for a predetermined period of time.

Figure 1B:
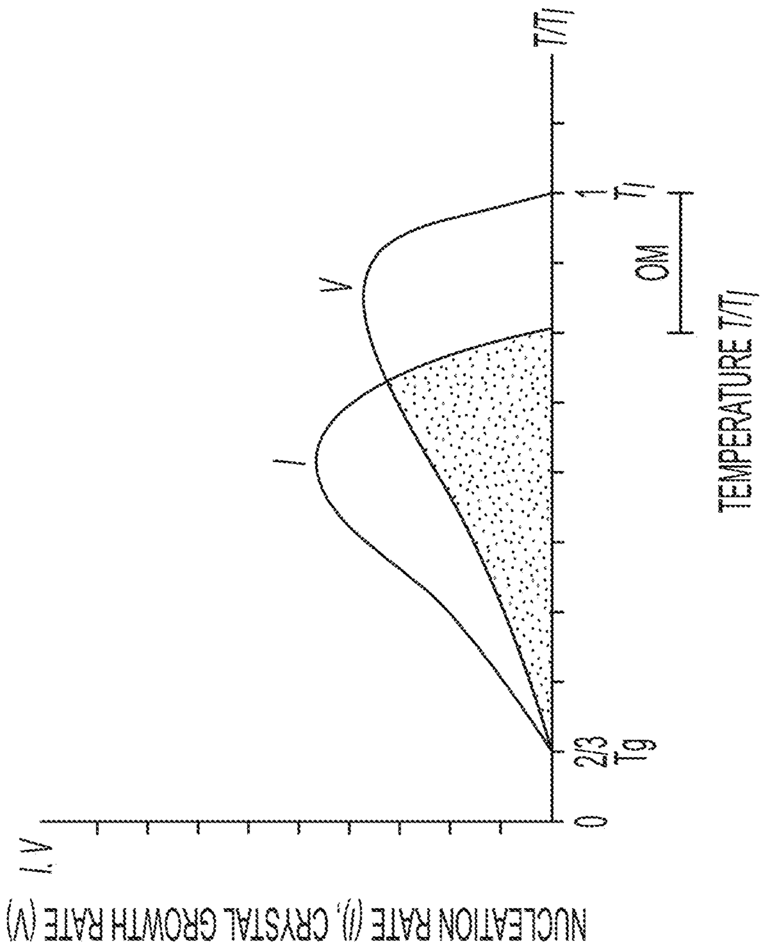
FIG. 1B graphically depicts the nucleation rate and crystal growth rate versus temperature in a ceram cycle according to embodiments disclosed and described herein.

Historically, the nucleation temperature and time are chosen empirically above the glass transition temperature (Tg) or anneal temperature as shown in FIG. 1B. Similarly, the growth temperature and time are also chosen empirically above the nucleation temperature. Beneficial time and temperature can be achieved by changing both time and temperature for nucleation and growth stages of processing. The nucleation and crystal growth events are often overlapping. Therefore, physical properties such as viscosity evolve as a function of time in both nucleation and growth steps. However, the rate of the increase in density and/or viscosity changes when transitioning from the nucleation stage to the growth stage.

The glass sheets may be made from any glass composition that is suitable for forming glass-ceramic articles, although it should be understood that the glass composition of the glass sheets can impact the mechanical and optical properties of the glass-ceramic article. In various embodiments, the glass composition is selected such that the resultant glass-ceramic article has a petalite crystalline phase and a lithium silicate crystalline phase. In some embodiments, the petalite crystalline phase and the lithium silicate crystalline phase have higher weight percentages than other crystalline phases present in the glass-ceramic article.

In various embodiments, the glass compositions can be manufactured into sheets via processes, including but not limited to, slot draw, float, rolling, and other sheet-forming processes known to those skilled in the art.

In traditional processes for forming 3D glass ceramic articles, a precursor glass sheet is formed by conventional processes and placed in a mold while in an entirely amorphous state (such as before nucleation has been performed). The precursor glass is formed into a desired 3D shape, thus forming a 3D glass article in the mold, such as by heating and applying mechanical pressure to the mold, for a period of time sufficient to form a 3D glass article. Once the 3D glass article has been formed, the 3D glass article is traditionally cerammed by removing the 3D glass article from the mold and placing the 3D glass article into a furnace or lehr where the 3D glass article is subjected to temperatures that ceram the 3D glass article, as discussed above, and form a 3D glass ceramic article.

However, during this ceramming cycle there are volume changes due to crystallization, thus the formed 3D shape often distorts. Put differently, the 3D glass article changes shape, often times in unexpected and hard to control ways, during the ceramming process.

More particularly, glass ceramics with a crystal phase exceeding about 15 wt % cannot be formed into consumer electronics cover shapes with small bend radii (<10 mm). One option to obtain glass ceramic 3D shaped article with >15 wt % crystal phase is to form the precursor glass, and then ceram the resulting 3D article. However when the 3D article is cerammed it undergoes densification and volume change. The 3D article is taken to a temperature corresponding to low viscosity during the ceram cycle where it can easily be deformed, especially when the 3D article is made from thin glass that is typically used for consumer electronics cover glass (thickness ranging from 0.4 mm-1.5 mm). Therefore, to achieve precision tolerances of <±0.100 mm of cerammed 3D shaped article made from green glass, the 3D article is held on the mold during ceramming process. Typical ceram process is longer than 1 hour (hr), which makes ceramming the 3D cover glass article on precision mold costly. In addition, with such a long tact time on the mold and at low viscosity for a period of the ceram cycle, the mold life is very short, thus increasing the cost of 3D cerammed article even further. Given the tight tolerances for 3D components in consumer electronics (such as tolerances less than ±100 μm), this change of shape can lead to unacceptable articles.

Accordingly, processes are needed for forming 3D glass ceramic articles that more closely match the designed shape of the 3D article after the ceramming process has been conducted. It is especially challenging to ceram 3D-shaped thin glass articles with thickness ranging from 0.4 mm to about 2 mm, as they are easily distorted if cerammed in 3D shape without being held under compression between 2 molds.

Embodiments disclosed and described herein address the above problems of conventional 3D glass ceramic processes by conducting at least a portion of the ceramming process while the article is in the mold. According to embodiments, at least the crystallization stage of the ceramming process is conducted in the mold.

Crystallizing Pre-Nucleated Glass in a Mold

Figure 2A:
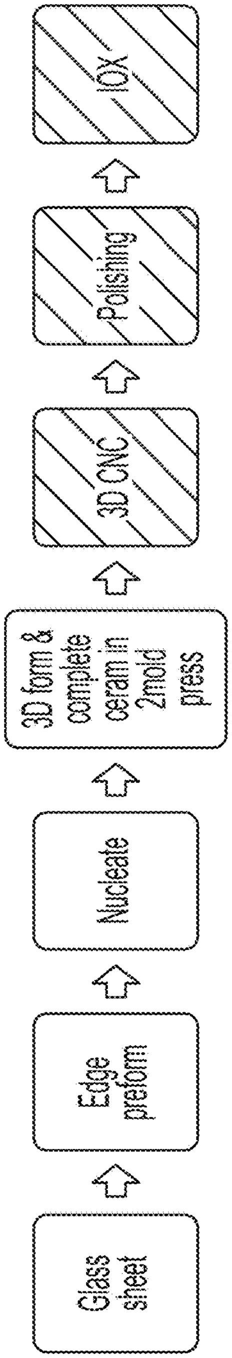
FIGS. 2A-2C are flow charts of processes for forming three dimensional glass articles according to embodiments disclosed and described herein.
Figure 2B:
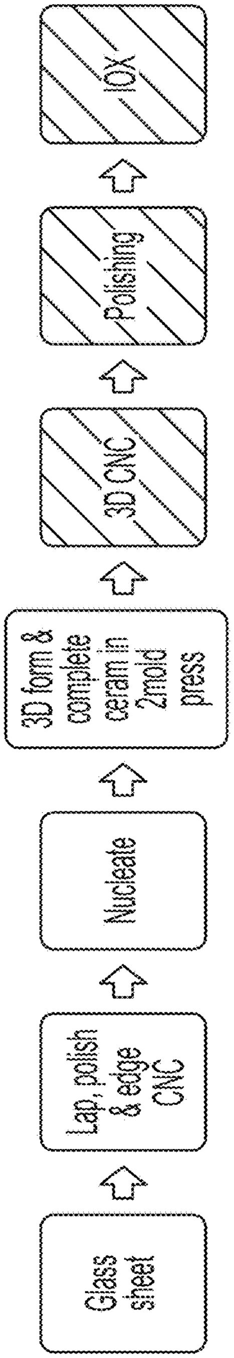
Figure 2C:
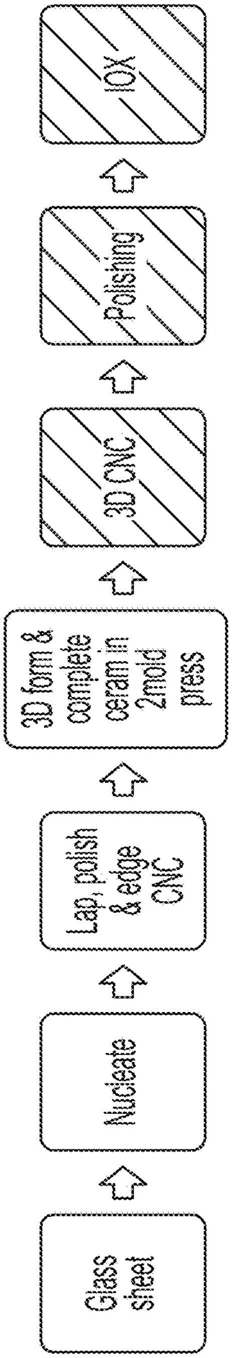

According some embodiments, a green glass sheet (also referred to as a precursor glass or precursor glass sheet) is nucleated in a furnace or lehr using conventional nucleation methods. Three flow charts of the process are shown in FIGS. 2A-2C. Each of the flow charts in FIGS. 2A-2C start with a precursor glass sheet and nucleate before 3D forming. However, in embodiments, the glass sheet is processed before nucleation—such as by edge preforming, lapping, polishing, and edge machining by computer numerical control (CNC)—before nucleating (FIGS. 2A and 2B). In embodiments, the glass sheet is nucleated before such processing (FIG. 2C). In each of the embodiments depicted in FIGS. 2A-2C, further processing—such as 3D CNC, polishing, and strengthening (such as by ion exchange)—may be conducted after 3D forming and ceramming in a 2 mold process, which is described in more detail below. Before the crystallization stage begins, the nucleated glass article is removed from the furnace or lehr and placed in a mold. In embodiments, the nucleated glass may be cooled from the nucleation temperature to room temperature—or any temperature between the nucleation temperature and room temperature—prior to placing the nucleated glass into the mold. This cooling may allow stresses in the nucleated glass to relax. The nucleated glass is taken to room temperature, and lapped and polished into a preform for 3D forming. Alternatively, the nucleated glass can just be cut into preform shape and placed on the mold. However in this case the nucleated glass surface is rough and may have surface imperfections that occur during nucleation and thus may damage the mold and shorten the mold life. Thus, it is preferred to lap and polish the nucleated sheet before it is put on the mold. As stated above, as the glass ceramic becomes crystallized, it becomes more and more difficult to 3D form the glass ceramic. Accordingly, in embodiments where the glass is nucleated before it is placed in the mold, the glass may advantageously have low crystal phase content so it can be become sufficiently viscous when heated on the mold to be bent into a desired bend radius in order to be able to make a 3D glass article. Therefore, in embodiments, the glass article comprises less than or equal to 15% of a crystalline phase when it is placed in the mold, such as less than or equal to 14% of a crystalline phase, less than or equal to 13% of a crystalline phase, less than or equal to 12% of a crystalline phase, less than or equal to 11% of a crystalline phase, less than or equal to 10% of a crystalline phase, less than or equal to 9% of a crystalline phase, less than or equal to 8% of a crystalline phase, less than or equal to 7% of a crystalline phase, less than or equal to 6% of a crystalline phase, or less than or equal to 5% of a crystalline phase, for example from 5% of a crystalline phase to 15% of a crystalline phase, or from 6% of a crystalline phase to 14% of a crystalline phase, or from 7% of a crystalline phase to 13% of a crystalline phase, or from 8% of a crystalline phase to 12% of a crystalline phase, or from 9% of a crystalline phase to 11% of a crystalline phase, including all ranges and subranges within the foregoing ranges. According to embodiments, the glass ceramic composition comprises from greater than or equal to 40% to less than or equal to 45% lithium disilicate, from greater than or equal to 40% to less than or equal to 45% petalite, and from greater than or equal to 0% to less than or equal to 5% lithium metasilicate.

Although the nucleation process in such embodiments is not particularly limited, in some embodiments, the amorphous glass article may be nucleated at temperatures from greater than or equal to 450° C. to less than or equal to 750° C., such as from greater than or equal to 475° C. to less than or equal to 750° C., from greater than or equal to 500° C. to less than or equal to 750° C., from greater than or equal to 525° C. to less than or equal to 750° C., from greater than or equal to 550° C. to less than or equal to 750° C., from greater than or equal to 575° C. to less than or equal to 750° C., from greater than or equal to 600° C. to less than or equal to 750° C., from greater than or equal to 625° C. to less than or equal to 750° C., from greater than or equal to 650° C. to less than or equal to 750° C., from greater than or equal to 675° C. to less than or equal to 750° C., from greater than or equal to 700° C. to less than or equal to 750° C., or from greater than or equal to 725° C. to less than or equal to 750° C. including all ranges and subranges within the foregoing ranges. In some embodiments, the amorphous glass article may be nucleated at temperatures from greater than or equal to 450° C. to less than or equal to 725° C., such as from greater than or equal to 450° C. to less than or equal to 700° C., from greater than or equal to 450° C. to less than or equal to 675° C., from greater than or equal to 450° C. to less than or equal to 650° C., from greater than or equal to 450° C. to less than or equal to 625° C., from greater than or equal to 450° C. to less than or equal to 600° C., from greater than or equal to 450° C. to less than or equal to 575° C., from greater than or equal to 450° C. to less than or equal to 550° C., from greater than or equal to 450° C. to less than or equal to 525° C., from greater than or equal to 450° C. to less than or equal to 500° C., or from greater than or equal to 450° C. to less than or equal to 475° C. including all ranges and subranges within the foregoing ranges. In some embodiments, the amorphous glass article may be nucleated at temperatures from greater than or equal to 475° C. to less than or equal to 725° C., such as from greater than or equal to 500° C. to less than or equal to 700° C., from greater than or equal to 525° C. to less than or equal to 675° C., from greater than or equal to 550° C. to less than or equal to 650° C., or from greater than or equal to 575° C. to less than or equal to 625° C. including all ranges and subranges within the foregoing ranges.

The amorphous glass article may be held at the nucleating temperature for a duration from greater than or equal to 1.0 hours to less than or equal to 4.0 hours, such as from greater than or equal to 1.5 hours to less than or equal to 4.0 hours, from greater than or equal to 2.0 hours to less than or equal to 4.0 hours, from greater than or equal to 2.5 hours to less than or equal to 4.0 hours, from greater than or equal to 3.0 hours to less than or equal to 4.0 hours, or from greater than or equal to 3.5 hours to less than or equal to 4.0 hours including all ranges and subranges within the foregoing ranges. In some embodiments the amorphous glass article may be held at the nucleating temperature for a duration from greater than or equal to 1.0 hours to less than or equal to 3.5 hours, such as from greater than or equal to 1.0 hours to less than or equal to 3.0 hours, from greater than or equal to 1.0 hours to less than or equal to 2.5 hours, from greater than or equal to 1.0 hours to less than or equal to 2.0 hours, or from greater than or equal to 1.0 hours to less than or equal to 1.5 hours including all ranges and subranges within the foregoing ranges. In some embodiments, the amorphous glass article may be held at the nucleating temperature for a duration from greater than or equal to 1.5 hours to less than or equal to 3.5 hours, such as from greater than or equal to 2.0 hours to less than or equal to 3.0 hours including all ranges and subranges within the foregoing ranges.

After the nucleated glass article is placed in the mold, the nucleated glass article is heated to the crystallization temperature where the nucleated glass article undergoes crystallization while still in the mold. During this heating process, the nucleated glass—which has a viscosity that is amenable to 3D forming—conforms to the shape of the mold and forms a 3D glass ceramic article. According to embodiments, the glass is rapidly heated to the crystallization temperature. This rapid heating mitigates deformations by quickly growing crystals in the nucleated glass and forming the glass ceramic. A skilled artisan would understand that once a sufficient number of crystals are formed in the glass ceramic, the glass ceramic is less prone to damage caused by the mold. Accordingly, by quickly heating the nucleated glass to the crystallization temperature, crystals are formed more quickly and the time that the glass is prone to defects is decreased. According to embodiments, the crystallization temperature is such that it results in 70% or more crystal phase and a glass phase of 30% or less in the 3D formed glass article. The 3D glass article formed from nucleated sheet may be crystallized at a temperature that is from greater than or equal to 50° C. to less than or equal to 100° C. higher than a temperature that is used in conventional ceramming processes to ceram a glass sheet that is part of a stack in a lehr. This increased temperatures allows for shortening the crystal growth time from about 0.5-1 hr (in conventional processes) to about 1-2 minutes. According to embodiments, the crystallization temperature may be from greater than or equal to 600° C. to less than or equal to 850° C., such as from greater than or equal to 625° C. to less than or equal to 850° C., from greater than or equal to 650° C. to less than or equal to 850° C., from greater than or equal to 675° C. to less than or equal to 850° C., from greater than or equal to 700° C. to less than or equal to 850° C., from greater than or equal to 725° C. to less than or equal to 850° C., from greater than or equal to 750° C. to less than or equal to 850° C., or from greater than or equal to 775° C. to less than or equal to 850° C. including all ranges and subranges within the foregoing range. According to some embodiments, the crystallization temperature may be from greater than or equal to 600° C. to less than or equal to 825° C., such as from greater than or equal to 600° C. to less than or equal to 800° C., from greater than or equal to 600° C. to less than or equal to 775° C., from greater than or equal to 600° C. to less than or equal to 750° C., from greater than or equal to 600° C. to less than or equal to 725° C., from greater than or equal to 600° C. to less than or equal to 700° C., from greater than or equal to 600° C. to less than or equal to 675° C., from greater than or equal to 600° C. to less than or equal to 650° C., or from greater than or equal to 600° C. to less than or equal to 625° C. including all ranges and subranges within the foregoing ranges. In some embodiments, the crystallization temperature may be from greater than or equal to 625° C. to less than or equal to 775° C., such as from greater than or equal to 650° C. to less than or equal to 750° C., or from greater than or equal to 675° C. to less than or equal to 725° C. including all ranges and subranges within the foregoing ranges.

The nucleated glass article may be held at the crystallization temperature for a duration from greater than or equal to 90 seconds to less than or equal to 450 seconds, such as from greater than or equal to 100 seconds to less than or equal to 450 seconds, from greater than or equal to 125 seconds to less than or equal to 450 seconds, from greater than or equal to 150 seconds to less than or equal to 450 seconds, from greater than or equal to 175 seconds to less than or equal to 450 seconds, from greater than or equal to 200 seconds to less than or equal to 450 seconds, from greater than or equal to 225 seconds to less than or equal to 450 seconds, from greater than or equal to 250 seconds to less than or equal to 450 seconds, from greater than or equal to 275 seconds to less than or equal to 450 seconds, from greater than or equal to 300 seconds to less than or equal to 450 seconds, from greater than or equal to 325 seconds to less than or equal to 450 seconds, from greater than or equal to 350 seconds to less than or equal to 450 seconds, from greater than or equal to 375 seconds to less than or equal to 450 seconds, from greater than or equal to 400 seconds to less than or equal to 450 seconds, from greater than or equal to 400 seconds to less than or equal to 450 seconds, or from greater than or equal to 425 seconds to less than or equal to 450 seconds including all ranges and subranges within the foregoing ranges. In some embodiments, the nucleated glass article may be held at the crystallization temperature for a duration from greater than or equal to 90 seconds to less than or equal to 425 seconds, such as from greater than or equal to 90 seconds to less than or equal to 400 seconds, from greater than or equal to 90 seconds to less than or equal to 375 seconds, from greater than or equal to 90 seconds to less than or equal to 350 seconds, from greater than or equal to 90 seconds to less than or equal to 325 seconds, from greater than or equal to 90 seconds to less than or equal to 300 seconds, from greater than or equal to 90 seconds to less than or equal to 275 seconds, from greater than or equal to 90 seconds to less than or equal to 250 seconds, from greater than or equal to 90 seconds to less than or equal to 225 seconds, from greater than or equal to 90 seconds to less than or equal to 200 seconds, from greater than or equal to 90 seconds to less than or equal to 175 seconds, from greater than or equal to 90 seconds to less than or equal to 150 seconds, from greater than or equal to 90 seconds to less than or equal to 125 seconds, or from greater than or equal to 90 seconds to less than or equal to 100 seconds including all ranges and subranges within the foregoing ranges. In some embodiments, the nucleated glass article may be held at the crystallization temperature for a duration from greater than or equal to 175 seconds to less than or equal to 425 seconds, such as from greater than or equal to 200 seconds to less than or equal to 400 seconds, from greater than or equal to 225 seconds to less than or equal to 375 seconds, from greater than or equal to 250 seconds to less than or equal to 350 seconds, or from greater than or equal to 275 seconds to less than or equal to 325 seconds including all ranges and subranges within the foregoing ranges.

After the nucleated glass is heated and held at the crystallization temperature, it is slowly cooled back to room temperature at a rate from greater than or equal to 0.1° C./sec to less than or equal to 8° C./sec and all ranges and subranges within the foregoing range for example from greater than or equal to 0.2° C./sec to less than or equal to 7.5° C./sec, or from greater than or equal to 0.3° C./sec to less than or equal to 7° C./sec, or from greater than or equal to 0.4° C./sec to less than or equal to 6.5° C./sec, or from greater than or equal to 0.5° C./sec to less than or equal to 6° C./sec, or from greater than or equal to 0.6° C./sec to less than or equal to 5.5° C./sec, or from greater than or equal to 0.7° C./sec to less than or equal to 5° C./sec, or from greater than or equal to 0.8° C./sec to less than or equal to 4.5° C./sec, or from greater than or equal to 0.9° C./sec to less than or equal to 4° C./sec, or from greater than or equal to 1.0° C./sec to less than or equal to 3.5° C./sec, or from greater than or equal to 1.1° C./sec to less than or equal to 3° C./sec, or from greater than or equal to 1.2° C./sec to less than or equal to 2.5° C./sec, or from greater than or equal to 1.3° C./sec to less than or equal to 2° C./sec, or from greater than or equal to 1.4° C./sec to less than or equal to 2° C./sec, or from greater than or equal to 1.5° C./sec to less than or equal to 2° C./sec. In embodiments, the glass may be actively cooled from the crystallization temperature to room temperature. In some embodiments, the glass may be allowed to passively cool from the crystallization temperature to room temperature by exposing the glass to an environment that is at room temperature.

According to embodiments, mechanical pressure may be applied to the glass during the crystallization process through the mold. Without being bound by any particular theory, applying pressure to the glass through the mold during the crystallization process mitigates deformation of the glass during the crystallization process by physically hindering the movement and expansion of the glass within the mold, and applying this pressure may allow fast heating of the glass to the crystallization temperature. In addition, and without being bound to any particular theory, it is believed that applying pressure to the glass through the mold may also allow the crystallization to be conducted for shorter durations, such as the durations disclosed above.

In embodiments, the pressure applied to the glass may be from greater than or equal to 0.10 MPa to less than or equal to 1.00 MPa, such as from greater than or equal to 0.25 MPa to less than or equal to 1.00 MPa, from greater than or equal to 0.40 MPa to less than or equal to 1.00 MPa, from greater than or equal to 0.50 MPa to less than or equal to 1.00 MPa, from greater than or equal to 0.60 MPa to less than or equal to 1.00 MPa, from greater than or equal to 0.75 MPa to less than or equal to 1.00 MPa, from greater than or equal to 0.80 MPa to less than or equal to 1.00 MPa, or from greater than or equal to 0.90 MPa to less than or equal to 1.00 MPa including all ranges and subranges within the foregoing ranges. In some embodiments, the pressure applied to the glass may be from greater than or equal to 0.10 MPa to less than or equal to 0.90 MPa, such as from greater than or equal to 0.10 MPa to less than or equal to 0.80 MPa, from greater than or equal to 0.10 MPa to less than or equal to 0.75 MPa, from greater than or equal to 0.10 MPa to less than or equal to 0.60 MPa, from greater than or equal to 0.10 MPa to less than or equal to 0.50 MPa, from greater than or equal to 0.10 MPa to less than or equal to 0.40 MPa, or from greater than or equal to 0.10 MPa to less than or equal to 0.25 MPa including all ranges and subranges within the foregoing ranges. In some embodiments, the pressure applied to the glass may be from greater than or equal to 0.25 MPa to less than or equal to 0.90 MPa, such as from greater than or equal to 0.40 MPa to less than or equal to 0.80 MPa, or from greater than or equal to 0.50 MPa to less than or equal to 0.75 MPa including all ranges and subranges within the foregoing ranges. In some embodiments, the pressure applied to the glass may be from greater than or equal to 0.10 MPa to less than or equal to 0.50 MPa, such as from greater than or equal to 0.25 MPa to less than or equal to 0.50 MPa including all ranges and subranges within the foregoing ranges.

Once the glass has been crystallized to form a 3D glass ceramic article and cooled to room temperature, the 3D glass ceramic article may be finished by tradition and commonly known finishing processes, for example computer numerical controlled (CNC) machining, grinding, polishing, strengthening (for example, chemical or thermal strengthening), and the like.

Nucleating and Crystallizing Glass in a Mold

According some embodiments, a green, amorphous glass sheet is nucleated and crystallized in a mold. In embodiments, the amorphous glass may be cooled to room temperature prior to placing the amorphous glass into the mold. This cooling may allow stresses in the amorphous glass to relax.

Once the amorphous glass is placed in the mold, the amorphous glass may be nucleated at temperatures from greater than or equal to 450° C. to less than or equal to 750° C., such as from greater than or equal to 475° C. to less than or equal to 750° C., from greater than or equal to 500° C. to less than or equal to 750° C., from greater than or equal to 525° C. to less than or equal to 750° C., from greater than or equal to 550° C. to less than or equal to 750° C., from greater than or equal to 575° C. to less than or equal to 750° C., from greater than or equal to 600° C. to less than or equal to 750° C., from greater than or equal to 625° C. to less than or equal to 750° C., from greater than or equal to 650° C. to less than or equal to 750° C., from greater than or equal to 675° C. to less than or equal to 750° C., from greater than or equal to 700° C. to less than or equal to 750° C., or from greater than or equal to 725° C. to less than or equal to 750° C. including all ranges and subranges within the foregoing ranges. In some embodiments, the amorphous glass article may be nucleated at temperatures from greater than or equal to 450° C. to less than or equal to 725° C., such as from greater than or equal to 450° C. to less than or equal to 700° C., from greater than or equal to 450° C. to less than or equal to 675° C., from greater than or equal to 450° C. to less than or equal to 650° C., from greater than or equal to 450° C. to less than or equal to 625° C., from greater than or equal to 450° C. to less than or equal to 600° C., from greater than or equal to 450° C. to less than or equal to 575° C., from greater than or equal to 450° C. to less than or equal to 550° C., from greater than or equal to 450° C. to less than or equal to 525° C., from greater than or equal to 450° C. to less than or equal to 500° C., or from greater than or equal to 450° C. to less than or equal to 475° C. including all ranges and subranges within the foregoing ranges. In some embodiments, the amorphous glass article may be nucleated at temperatures from greater than or equal to 475° C. to less than or equal to 725° C., such as from greater than or equal to 500° C. to less than or equal to 700° C., from greater than or equal to 525° C. to less than or equal to 675° C., from greater than or equal to 550° C. to less than or equal to 650° C., or from greater than or equal to 575° C. to less than or equal to 625° C. including all ranges and subranges within the foregoing ranges.

The amorphous glass article may be held at the nucleating temperature for a duration from greater than or equal to 1.0 hours to less than or equal to 4.0 hours, such as from greater than or equal to 1.5 hours to less than or equal to 4.0 hours, from greater than or equal to 2.0 hours to less than or equal to 4.0 hours, from greater than or equal to 2.5 hours to less than or equal to 4.0 hours, from greater than or equal to 3.0 hours to less than or equal to 4.0 hours, or from greater than or equal to 3.5 hours to less than or equal to 4.0 hours including all ranges and subranges within the foregoing ranges. In some embodiments the amorphous glass article may be held at the nucleating temperature for a duration from greater than or equal to 1.0 hours to less than or equal to 3.5 hours, such as from greater than or equal to 1.0 hours to less than or equal to 3.0 hours, from greater than or equal to 1.0 hours to less than or equal to 2.5 hours, from greater than or equal to 1.0 hours to less than or equal to 2.0 hours, or from greater than or equal to 1.0 hours to less than or equal to 1.5 hours including all ranges and subranges within the foregoing ranges. In some embodiments, the amorphous glass article may be held at the nucleating temperature for a duration from greater than or equal to 1.5 hours to less than or equal to 3.5 hours, such as from greater than or equal to 2.0 hours to less than or equal to 3.0 hours including all ranges and subranges within the foregoing ranges. During this nucleating process, the glass conforms to the shape of the mold and forms a 3D nucleated glass article.

After nucleating, the 3D glass article is heated to the crystallization temperature where the nucleated glass article undergoes crystallization while still in the mold. According to embodiments, the glass is rapidly heated to the crystallization temperature. This rapid heating mitigates deformations by quickly growing crystals in the nucleated glass and forming the glass ceramic. A skilled artisan would understand that once a sufficient number of crystals are formed in the glass ceramic, the glass ceramic is less prone to defects caused by the mold. Accordingly, by quickly heating the glass article, crystals are quickly formed decreasing the amount of time that defects may be formed. According to embodiments, the crystallization temperature may be from greater than or equal to 600° C. to less than or equal to 850° C., such as from greater than or equal to 625° C. to less than or equal to 850° C., from greater than or equal to 650° C. to less than or equal to 850° C., from greater than or equal to 675° C. to less than or equal to 850° C., from greater than or equal to 700° C. to less than or equal to 850° C., from greater than or equal to 725° C. to less than or equal to 850° C., from greater than or equal to 750° C. to less than or equal to 850° C., or from greater than or equal to 775° C. to less than or equal to 850° C. including all ranges and subranges within the foregoing range. According to some embodiments, the crystallization temperature may be from greater than or equal to 600° C. to less than or equal to 825° C., such as from greater than or equal to 600° C. to less than or equal to 800° C., from greater than or equal to 600° C. to less than or equal to 775° C., from greater than or equal to 600° C. to less than or equal to 750° C., from greater than or equal to 600° C. to less than or equal to 725° C., from greater than or equal to 600° C. to less than or equal to 700° C., from greater than or equal to 600° C. to less than or equal to 675° C., from greater than or equal to 600° C. to less than or equal to 650° C., or from greater than or equal to 600° C. to less than or equal to 625° C. including all ranges and subranges within the foregoing ranges. In some embodiments, the crystallization temperature may be from greater than or equal to 625° C. to less than or equal to 775° C., such as from greater than or equal to 650° C. to less than or equal to 750° C., or from greater than or equal to 675° C. to less than or equal to 725° C. including all ranges and subranges within the foregoing ranges.

The nucleated glass article may be held at the crystallization temperature for a duration from greater than or equal to 90 seconds to less than or equal to 450 seconds, such as from greater than or equal to 100 seconds to less than or equal to 450 seconds, from greater than or equal to 125 seconds to less than or equal to 450 seconds, from greater than or equal to 150 seconds to less than or equal to 450 seconds, from greater than or equal to 175 seconds to less than or equal to 450 seconds, from greater than or equal to 200 seconds to less than or equal to 450 seconds, from greater than or equal to 225 seconds to less than or equal to 450 seconds, from greater than or equal to 250 seconds to less than or equal to 450 seconds, from greater than or equal to 275 seconds to less than or equal to 450 seconds, from greater than or equal to 300 seconds to less than or equal to 450 seconds, from greater than or equal to 325 seconds to less than or equal to 450 seconds, from greater than or equal to 350 seconds to less than or equal to 450 seconds, from greater than or equal to 375 seconds to less than or equal to 450 seconds, from greater than or equal to 400 seconds to less than or equal to 450 seconds, from greater than or equal to 400 seconds to less than or equal to 450 seconds, or from greater than or equal to 425 seconds to less than or equal to 450 seconds including all ranges and subranges within the foregoing ranges. In some embodiments, the nucleated glass article may be held at the crystallization temperature for a duration from greater than or equal to 90 seconds to less than or equal to 425 seconds, such as from greater than or equal to 90 seconds to less than or equal to 400 seconds, from greater than or equal to 90 seconds to less than or equal to 375 seconds, from greater than or equal to 90 seconds to less than or equal to 350 seconds, from greater than or equal to 90 seconds to less than or equal to 325 seconds, from greater than or equal to 90 seconds to less than or equal to 300 seconds, from greater than or equal to 90 seconds to less than or equal to 275 seconds, from greater than or equal to 90 seconds to less than or equal to 250 seconds, from greater than or equal to 90 seconds to less than or equal to 225 seconds, from greater than or equal to 90 seconds to less than or equal to 200 seconds, from greater than or equal to 90 seconds to less than or equal to 175 seconds, from greater than or equal to 90 seconds to less than or equal to 150 seconds, from greater than or equal to 90 seconds to less than or equal to 125 seconds, or from greater than or equal to 90 seconds to less than or equal to 100 seconds including all ranges and subranges within the foregoing ranges. In some embodiments, the nucleated glass article may be held at the crystallization temperature for a duration from greater than or equal to 175 seconds to less than or equal to 425 seconds, such as from greater than or equal to 200 seconds to less than or equal to 400 seconds, from greater than or equal to 225 seconds to less than or equal to 375 seconds, from greater than or equal to 250 seconds to less than or equal to 350 seconds, or from greater than or equal to 275 seconds to less than or equal to 325 seconds including all ranges and subranges within the foregoing ranges.

After the nucleated glass is heated and held at the crystallization temperature, it is slowly cooled back to room temperature at 0.1° C./sec to 8.0° C./sec including all ranges and subranges within the foregoing range, for example from greater than or equal to 0.2° C./sec to less than or equal to 7.5° C./sec, or from greater than or equal to 0.3° C./sec to less than or equal to 7° C./sec, or from greater than or equal to 0.4° C./sec to less than or equal to 6.5° C./sec, or from greater than or equal to 0.5° C./sec to less than or equal to 6° C./sec, or from greater than or equal to 0.6° C./sec to less than or equal to 5.5° C./sec, or from greater than or equal to 0.7° C./sec to less than or equal to 5° C./sec, or from greater than or equal to 0.8° C./sec to less than or equal to 4.5° C./sec, or from greater than or equal to 0.9° C./sec to less than or equal to 4° C./sec, or from greater than or equal to 1.0° C./sec to less than or equal to 3.5° C./sec, or from greater than or equal to 1.1° C./sec to less than or equal to 3° C./sec, or from greater than or equal to 1.2° C./sec to less than or equal to 2.5° C./sec, or from greater than or equal to 1.3° C./sec to less than or equal to 2° C./sec, or from greater than or equal to 1.4° C./sec to less than or equal to 2° C./sec, or from greater than or equal to 1.5° C./sec to less than or equal to 2° C./sec. In embodiments, the glass may be actively cooled from the crystallization temperature to room temperature. In some embodiments, the glass may be allowed to passively cool from the crystallization temperature to room temperature by exposing the glass to an environment that is at room temperature.

According to some embodiments, mechanical pressure may be applied to the glass during the nucleation and crystallization processes through the mold. Without being bound by any particular theory, applying pressure to the glass through the mold during the nucleation and crystallization processes mitigates deformation of the glass during the nucleation and crystallization processes by physically hindering the movement and expansion of the glass within the mold, and applying this pressure may allow fast heating of the glass to the crystallization temperature. In addition, and without being bound to any particular theory, it is believed that applying pressure to the glass through the mold may also allow the crystallization to be conducted for shorter durations, such as the durations disclosed above.

In embodiments, the pressure applied to the glass may be from greater than or equal to 0.10 MPa to less than or equal to 1.00 MPa, such as from greater than or equal to 0.25 MPa to less than or equal to 1.00 MPa, from greater than or equal to 0.40 MPa to less than or equal to 1.00 MPa, from greater than or equal to 0.50 MPa to less than or equal to 1.00 MPa, from greater than or equal to 0.60 MPa to less than or equal to 1.00 MPa, from greater than or equal to 0.75 MPa to less than or equal to 1.00 MPa, from greater than or equal to 0.80 MPa to less than or equal to 1.00 MPa, or from greater than or equal to 0.90 MPa to less than or equal to 1.00 MPa including all ranges and subranges within the foregoing ranges. In some embodiments, the pressure applied to the glass may be from greater than or equal to 0.10 MPa to less than or equal to 0.90 MPa, such as from greater than or equal to 0.10 MPa to less than or equal to 0.80 MPa, from greater than or equal to 0.10 MPa to less than or equal to 0.75 MPa, from greater than or equal to 0.10 MPa to less than or equal to 0.60 MPa, from greater than or equal to 0.10 MPa to less than or equal to 0.50 MPa, from greater than or equal to 0.10 MPa to less than or equal to 0.40 MPa, or from greater than or equal to 0.10 MPa to less than or equal to 0.25 MPa including all ranges and subranges within the foregoing ranges. In some embodiments, the pressure applied to the glass may be from greater than or equal to 0.25 MPa to less than or equal to 0.90 MPa, such as from greater than or equal to 0.40 MPa to less than or equal to 0.80 MPa, or from greater than or equal to 0.50 MPa to less than or equal to 0.75 MPa including all ranges and subranges within the foregoing ranges. In some embodiments, the pressure applied to the glass may be from greater than or equal to 0.10 MPa to less than or equal to 0.50 MPa, such as from greater than or equal to 0.25 MPa to less than or equal to 0.50 MPa including all ranges and subranges within the foregoing ranges.

Once the glass has been crystallized to form a 3D glass ceramic article and cooled to room temperature, the 3D glass ceramic article may be finished by tradition and commonly known finishing processes, for example computer numerical controlled (CNC) machining, grinding, polishing, strengthening (for example, chemical or thermal strengthening), and the like.

Nucleating Glass in a Mold

According some embodiments, a green, amorphous glass sheet is nucleated in a mold and crystallized outside of the mold. In embodiments, the amorphous glass may be cooled to room temperature prior to placing the amorphous glass into the mold. This cooling may allow stresses in the amorphous glass to relax.

Once the amorphous glass is placed in the mold, the amorphous glass may be nucleated at temperatures from greater than or equal to 450° C. to less than or equal to 750° C., such as from greater than or equal to 475° C. to less than or equal to 750° C., from greater than or equal to 500° C. to less than or equal to 750° C., from greater than or equal to 525° C. to less than or equal to 750° C., from greater than or equal to 550° C. to less than or equal to 750° C., from greater than or equal to 575° C. to less than or equal to 750° C., from greater than or equal to 600° C. to less than or equal to 750° C., from greater than or equal to 625° C. to less than or equal to 750° C., from greater than or equal to 650° C. to less than or equal to 750° C., from greater than or equal to 675° C. to less than or equal to 750° C., from greater than or equal to 700° C. to less than or equal to 750° C., or from greater than or equal to 725° C. to less than or equal to 750° C. including all ranges and subranges within the foregoing ranges. In some embodiments, the amorphous glass article may be nucleated at temperatures from greater than or equal to 450° C. to less than or equal to 725° C., such as from greater than or equal to 450° C. to less than or equal to 700° C., from greater than or equal to 450° C. to less than or equal to 675° C., from greater than or equal to 450° C. to less than or equal to 650° C., from greater than or equal to 450° C. to less than or equal to 625° C., from greater than or equal to 450° C. to less than or equal to 600° C., from greater than or equal to 450° C. to less than or equal to 575° C., from greater than or equal to 450° C. to less than or equal to 550° C., from greater than or equal to 450° C. to less than or equal to 525° C., from greater than or equal to 450° C. to less than or equal to 500° C., or from greater than or equal to 450° C. to less than or equal to 475° C. including all ranges and subranges within the foregoing ranges. In some embodiments, the amorphous glass article may be nucleated at temperatures from greater than or equal to 475° C. to less than or equal to 725° C., such as from greater than or equal to 500° C. to less than or equal to 700° C., from greater than or equal to 525° C. to less than or equal to 675° C., from greater than or equal to 550° C. to less than or equal to 650° C., or from greater than or equal to 575° C. to less than or equal to 625° C. including all ranges and subranges within the foregoing ranges.

The amorphous glass article may be held at the nucleating temperature for a duration from greater than or equal to 1.0 hours to less than or equal to 4.0 hours, such as from greater than or equal to 1.5 hours to less than or equal to 4.0 hours, from greater than or equal to 2.0 hours to less than or equal to 4.0 hours, from greater than or equal to 2.5 hours to less than or equal to 4.0 hours, from greater than or equal to 3.0 hours to less than or equal to 4.0 hours, or from greater than or equal to 3.5 hours to less than or equal to 4.0 hours including all ranges and subranges within the foregoing ranges. In some embodiments the amorphous glass article may be held at the nucleating temperature for a duration from greater than or equal to 1.0 hours to less than or equal to 3.5 hours, such as from greater than or equal to 1.0 hours to less than or equal to 3.0 hours, from greater than or equal to 1.0 hours to less than or equal to 2.5 hours, from greater than or equal to 1.0 hours to less than or equal to 2.0 hours, or from greater than or equal to 1.0 hours to less than or equal to 1.5 hours including all ranges and subranges within the foregoing ranges. In some embodiments, the amorphous glass article may be held at the nucleating temperature for a duration from greater than or equal to 1.5 hours to less than or equal to 3.5 hours, such as from greater than or equal to 2.0 hours to less than or equal to 3.0 hours including all ranges and subranges within the foregoing ranges. During this nucleating process, the glass conforms to the shape of the mold and forms a 3D nucleated glass article.

According to some embodiments, mechanical pressure may be applied to the glass during the nucleation process through the mold. Without being bound by any particular theory, applying pressure to the glass through the mold during the nucleation process mitigates deformation of the glass during the nucleation process by physically hindering the movement and expansion of the glass within the mold.

In embodiments, the pressure applied to the glass may be from greater than or equal to 0.10 MPa to less than or equal to 1.00 MPa, such as from greater than or equal to 0.25 MPa to less than or equal to 1.00 MPa, from greater than or equal to 0.40 MPa to less than or equal to 1.00 MPa, from greater than or equal to 0.50 MPa to less than or equal to 1.00 MPa, from greater than or equal to 0.60 MPa to less than or equal to 1.00 MPa, from greater than or equal to 0.75 MPa to less than or equal to 1.00 MPa, from greater than or equal to 0.80 MPa to less than or equal to 1.00 MPa, or from greater than or equal to 0.90 MPa to less than or equal to 1.00 MPa including all ranges and subranges within the foregoing ranges. In some embodiments, the pressure applied to the glass may be from greater than or equal to 0.10 MPa to less than or equal to 0.90 MPa, such as from greater than or equal to 0.10 MPa to less than or equal to 0.80 MPa, from greater than or equal to 0.10 MPa to less than or equal to 0.75 MPa, from greater than or equal to 0.10 MPa to less than or equal to 0.60 MPa, from greater than or equal to 0.10 MPa to less than or equal to 0.50 MPa, from greater than or equal to 0.10 MPa to less than or equal to 0.40 MPa, or from greater than or equal to 0.10 MPa to less than or equal to 0.25 MPa including all ranges and subranges within the foregoing ranges. In some embodiments, the pressure applied to the glass may be from greater than or equal to 0.25 MPa to less than or equal to 0.90 MPa, such as from greater than or equal to 0.40 MPa to less than or equal to 0.80 MPa, or from greater than or equal to 0.50 MPa to less than or equal to 0.75 MPa including all ranges and subranges within the foregoing ranges. In some embodiments, the pressure applied to the glass may be from greater than or equal to 0.10 MPa to less than or equal to 0.50 MPa, such as from greater than or equal to 0.25 MPa to less than or equal to 0.50 MPa including all ranges and subranges within the foregoing ranges.

After nucleating, the 3D nucleated glass article is removed from the mold and then heated to the crystallization temperature outside of the mold, for example, in a furnace or a lehr. It should be understood that any conventional crystallization process may be used to crystallize the nucleated 3D glass article. According to embodiments, the crystallization temperature may be from greater than or equal to 600° C. to less than or equal to 850° C., such as from greater than or equal to 625° C. to less than or equal to 850° C., from greater than or equal to 650° C. to less than or equal to 850° C., from greater than or equal to 675° C. to less than or equal to 850° C., from greater than or equal to 700° C. to less than or equal to 850° C., from greater than or equal to 725° C. to less than or equal to 850° C., from greater than or equal to 750° C. to less than or equal to 850° C., or from greater than or equal to 775° C. to less than or equal to 850° C. including all ranges and subranges within the foregoing range. According to some embodiments, the crystallization temperature may be from greater than or equal to 600° C. to less than or equal to 825° C., such as from greater than or equal to 600° C. to less than or equal to 800° C., from greater than or equal to 600° C. to less than or equal to 775° C., from greater than or equal to 600° C. to less than or equal to 750° C., from greater than or equal to 600° C. to less than or equal to 725° C., from greater than or equal to 600° C. to less than or equal to 700° C., from greater than or equal to 600° C. to less than or equal to 675° C., from greater than or equal to 600° C. to less than or equal to 650° C., or from greater than or equal to 600° C. to less than or equal to 625° C. including all ranges and subranges within the foregoing ranges. In some embodiments, the crystallization temperature may be from greater than or equal to 625° C. to less than or equal to 775° C., such as from greater than or equal to 650° C. to less than or equal to 750° C., or from greater than or equal to 675° C. to less than or equal to 725° C. including all ranges and subranges within the foregoing ranges. The duration of the crystallization process can be any suitable duration, including those disclosed above.

Although methods according to embodiments may be used on any known glass precursor composition, in some embodiments, the glass precursor has a composition, on an oxide basis, that falls within the ranges provided in Table 1 below:

TABLE 1

| Oxide | Mol % |
|---|---|
| $SiO_2$ | 60-72 |
| $Al_2O_3$ | 0-6 |
| $Li_2O$ | 20-32 |
| $B_2O_3$ | 0-2 |
| $Na_2O$ | 0-2 |
| $K_2O$ | 0-2 |
| $P_2O_5$ | 0.7-2.2 |
| $ZrO_2$ | 1.7-4.5 |
| $SnO_2$ | 0.05-0.5 |
| $Fe_2O_3$ | 0-0.5 |
| MgO | 0-1 |
| ZnO | 0-1 |
| BaO | 0-1 |
| SrO | 0-1 |
| $La_2O_3$ | 0-1 |
| $GeO_2$ | 0-1 |
| $Ta_2O_5$ | 0-1 |

In some embodiments, the glass precursor has a composition, on an oxide basis, as shown in Table 2 below:

TABLE 2

| Oxide | Mol % | Mol % | Mol % |
|---|---|---|---|
| $SiO_2$ | 70.65 | 69.35 | 68.34 |
| $Al_2O_3$ | 4.20 | 3.73 | 2.71 |
| LiO | 22.10 | 21.68 | 21.36 |
| $Na_2O$ | 0.00 | 0.49 | 1.93 |
| $K_2O$ | 0.00 | 0.74 | 0.72 |
| $P_2O_5$ | 0.90 | 0.98 | 0.97 |
| $ZrO_2$ | 2.00 | 2.94 | 3.87 |
| $SnO_2$ | 0.15 | 0.10 | 0.10 |
| $B_2O_3$ | 0.00 | 0.00 | 0.00 |
| $Li_2O/R_2O$ | 1.00 | 0.95 | 0.89 |
| $R_2O/Al_2O_3$ | 5.26 | 6.14 | 8.88 |

Once the glass has been crystallized to form a 3D glass ceramic article and cooled to room temperature, the 3D glass ceramic article may be finished by traditional and commonly known finishing processes, for example computer numerical controlled (CNC) machining, grinding, polishing, strengthening (for example, chemical or thermal strengthening), and the like.

In embodiments, the 3D glass ceramic may be chemically strengthened, such as by ion exchange strengthening. The ion exchange strengthening may be provided by exposing the 3D glass ceramic to a molten salt, such as by dipping the 3D glass ceramic in a molten salt bath, or applying the molten salt to one or more surfaces of the 3D glass ceramic, such as by spraying or otherwise applying a molten salt to the one or more surfaces of the 3D glass ceramic. In embodiments, the molten salt comprises alkali nitrates (such as potassium nitrate ($KNO_3$), sodium nitrate ($NaNO_3$), and lithium nitrate ($LiNO_3$)), alkali nitrites (such as potassium nitrite ($KNO_2$), sodium nitrite ($NaNO_2$), and lithium nitrite ($LiNO_2$)), and silicic acid. Various combinations of alkali nitrates, alkali nitrites, and silicic acid may be used. In embodiments, the molten salt may comprise from greater than or equal to 50.0 wt % to less than or equal to 70.0 wt % $KNO_3$, from greater than or equal to 30.0 wt % to less than or equal to 50.0 wt % $NaNO_3$. In embodiments, the molten salt may include one or more of $LiNO_3$, $NaNO_2$, and silicic acid added as superadditions in amounts from greater than or equal to 0.1 wt % to less than or equal to 0.7 wt %. Superadditions, as used herein, refers to the addition of a component in amounts relative to 100% of the compositions. As a non-limiting and simplified example, where the molten salt comprises 70 g (70 wt %) $KNO_3$ and 30 g (30 wt %) $NaNO_3$, a superaddition of 1 wt % $LiNO_3$ would be 1 g $LiNO_3$ (i.e., 1% of the 100 g of $KNO_3$ and $NaNO_3$) The molten salt bath may be heated to a temperature that is from greater than or equal to 450° C. to less than or equal to 600° C., such as from greater than or equal to 450° C. to less than or equal to 550° C., or about 500° C. In embodiments, the 3D glass ceramic may be treated in the molten salt bath for a duration of greater than or equal to 3 hours to less than or equal to 8 hours, such as from greater than or equal to 4 hours to less than or equal to 8 hours, from greater than or equal to 5 hours to less than or equal to 8 hours, or from greater than or equal to 6 hours to less than or equal to 8 hours. In embodiments, the 3D glass ceramic may be treated in the molten salt bath for a duration of greater than or equal to 3 hours to less than or equal to 5 hours, such as from greater than or equal to 3 hours to less than or equal to 4 hours.

It was found that 3D glass ceramic articles manufactured according to embodiments disclosed and described herein allow for faster diffusion of ions from the molten salt bath into the glass article compared to glass articles that are cerammed using a lehr. Without being bound by any particular theory, it is believed that this faster diffusion of ions from the molten salt bath to the 3D glass ceramic article occurs because the thermal history of 3D glass ceramics made according to embodiments disclosed and described herein is different than the thermal history of glass articles formed in a lehr. Namely, articles that are cerammed in a lehr are slowly cooled to control warp, whereas 3D glass ceramic articles made according to embodiments disclosed and described herein can quickly cool the 3D glass ceramic articles. Properties achieved by this improved ion exchange process on the 3D glass ceramic articles are described below and in the accompanying examples.

After chemical strengthening has been conducted on the 3D glass ceramic, in embodiments, the 3D glass ceramic has a compressive stress (CS) from greater than or equal to 340 MPa to less than or equal to 400 MPa, such as from greater than or equal to 345 MPa to less than or equal to 400 MPa, from greater than or equal to 350 MPa to less than or equal to 400 MPa, from greater than or equal to 355 MPa to less than or equal to 400 MPa, from greater than or equal to 360 MPa to less than or equal to 400 MPa, from greater than or equal to 365 MPa to less than or equal to 400 MPa, from greater than or equal to 370 MPa to less than or equal to 400 MPa, from greater than or equal to 375 MPa to less than or equal to 400 MPa, from greater than or equal to 380 MPa to less than or equal to 400 MPa, from greater than or equal to 385 MPa to less than or equal to 400 MPa, from greater than or equal to 390 MPa to less than or equal to 400 MPa, from greater than or equal to 395 MPa to less than or equal to 400 MPa, from greater than or equal to 395 MPa to less than or equal to 400 MPa, and all ranges and subranges within these ranges. In embodiments, after chemical strengthening has been conducted on the 3D glass ceramic, the 3D glass ceramic has a CS from greater than or equal to 340 MPa to less than or equal to 395 MPa, such as from greater than or equal to 340 MPa to less than or equal to 390 MPa, from greater than or equal to 340 MPa to less than or equal to 385 MPa, from greater than or equal to 340 MPa to less than or equal to 380 MPa, from greater than or equal to 340 MPa to less than or equal to 375 MPa, from greater than or equal to 340 MPa to less than or equal to 370 MPa, from greater than or equal to 340 MPa to less than or equal to 365 MPa, from greater than or equal to 340 MPa to less than or equal to 360 MPa, from greater than or equal to 340 MPa to less than or equal to 355 MPa, from greater than or equal to 340 MPa to less than or equal to 350 MPa, from greater than or equal to 340 MPa to less than or equal to 345 MPa, and all ranges and subranges within these ranges. In embodiments, after chemical strengthening has been conducted on the 3D glass ceramic, the 3D glass ceramic has a CS from greater than or equal to 200 MPa to less than or equal to 395 MPa, such as from greater than or equal to 250 MPa to less than or equal to 390 MPa, from greater than or equal to 300 MPa to less than or equal to 385 MPa, from greater than or equal to 360 MPa to less than or equal to 380 MPa, from greater than or equal to 325 MPa to less than or equal to 375 MPa and all ranges, and subranges within these ranges. The CS was measured using a film stress measurement (FSM) system and measures near surface compressive stress.

Regarding the FSM measurement, this measurement may be conducted using commercially available instruments for example the FSM-6000, manufactured by Orihara Industrial Co., Ltd. (Japan). Surface stress measurements rely upon the accurate measurement of the stress optical coefficient (SOC), which is related to the birefringence of the glass-ceramic. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

After chemical strengthening has been conducted on the 3D glass ceramic, in embodiments, the 3D glass ceramic has a central tension (CT) from greater than or equal to 100 MPa to less than or equal to 150 MPa, such as from greater than or equal to 105 MPa to less than or equal to 150 MPa, from greater than or equal to 110 MPa to less than or equal to 150 MPa, from greater than or equal to 115 MPa to less than or equal to 150 MPa, from greater than or equal to 120 MPa to less than or equal to 150 MPa, from greater than or equal to 125 MPa to less than or equal to 150 MPa, from greater than or equal to 130 MPa to less than or equal to 150 MPa, from greater than or equal to 135 MPa to less than or equal to 150 MPa, from greater than or equal to 140 MPa to less than or equal to 150 MPa, from greater than or equal to 145 MPa to less than or equal to 150 MPa, and all ranges and subranges within these ranges. In embodiments, after chemical strengthening has been conducted on the 3D glass ceramic, the 3D glass ceramic has a CT from greater than or equal to 100 MPa to less than or equal to 145 MPa, such as from greater than or equal to 100 MPa to less than or equal to 140 MPa, from greater than or equal to 100 MPa to less than or equal to 135 MPa, from greater than or equal to 100 MPa to less than or equal to 130 MPa, from greater than or equal to 100 MPa to less than or equal to 125 MPa, from greater than or equal to 100 MPa to less than or equal to 120 MPa, from greater than or equal to 100 MPa to less than or equal to 115 MPa, from greater than or equal to 100 MPa to less than or equal to 110 MPa, from greater than or equal to 100 MPa to less than or equal to 105 MPa, and all ranges and subranges within these ranges. In embodiments, after chemical strengthening has been conducted on the 3D glass ceramic, the 3D glass ceramic has a CT from greater than or equal to 90 MPa MPa to less than or equal to 145 MPa, such as from greater than or equal to 110 MPa to less than or equal to 140 MPa, from greater than or equal to 115 MPa to less than or equal to 135 MPa, from greater than or equal to 120 MPa to less than or equal to 130 MPa, and all ranges and subranges within these ranges. The CT was measured by SLP 2000 (405 nm) using sixth order polynomial fit.

Regarding the SLP 2000 (405 nm) using sixth order polynomial fit, this measurement may be conducted using an Orihara SLP 2000 scattered light photoelastic stress meter operating at 405 nm used to obtain a depth of compression and central tension. The 405 nm wavelength may be particularly advantageous for transparent glass ceramics because it is believed that the 405 nm wavelength minimizes the speckle. However, a higher wavelength (e.g., 633 nm) can be used, although it may significantly increase speckle. In some such embodiments, speckle may be averaged out by moving the specimen during measurement.

The Orihara SLP 2000 includes a built-in 2× magnification telecentric lens, which enables a camera field of view of up to 600 μm in the depth direction. However, due to the high refractive index nature of glass ceramics, the depth perception can be extended to approximately 800 μm, allowing the SLP 2000 to be used to obtain a full stress profile measurement of various glass ceramic articles described herein.

In operation, a laser diode at 405 nm is periodically phase modulated through a liquid crystal variable retarder before entering the glass ceramic. Due to the stress distribution in the glass ceramic, the scattered light experiences a change in intensity and phase as it travels through the thickness of the glass ceramic. While light scatters in all directions, a camera set at 45° with respect to the surface of the glass ceramic captures the vertical component of the intensity fluctuations along the laser path. The phase shift experienced at each point along the laser path is captures via image analysis and an internal stress σ can be deduced according to the following equation (2):

$$\sigma = \left(\frac{1}{\beta}\right)\left(\frac{\lambda}{360}\right)\left(\frac{d\varphi}{dx}\right) \tag{2}$$

where λ is the wavelength of the laser, β is the stress optical coefficient (SOC), φ is the phase shift, and x is the optical path length.

The SLP 2000 software provide a live display of the laser beam inside the sample. In various embodiments, a $6^{th}$ order polynomial fit may be used to provide consistent results across various glass ceramic samples. However, processing area, laser wavelength, and the appropriate fitting function may vary depending on the particular embodiment.

After chemical strengthening has been conducted on the 3D glass ceramic, in embodiments, the 3D glass ceramic has a depth of compression (DOC) greater than or equal to 0.17*thickness. The DOC was measured by SLP 2000 (405 nm) using sixth order polynomial fit.

The effectiveness of the ion exchange may be exhibited in the drop test results of the 3D glass ceramic article. Even though the ion exchange is conducted for a shorter duration than articles cerammed in a lehr, the 3D glass ceramics according to embodiments disclosed and described herein perform equally well, or even better than, articles cerammed in a lehr. In embodiments, the 3D glass ceramic article survives 20 or more drops onto a broad surface of the 3D glass ceramic article from 1 meter onto an asphalt surface, such as 22 or more drops, 25 or more drops, 27 or more drops, or 30 or more drops without failure by glass breakage.

Additionally, drop tests were conducted by dropping a broad side of 3D glass ceramics onto 80 grit sandpaper dropping at progressively increased height starting at 30 cm in increments of 10 cm, to determine a height where glass breaks. In embodiments, 50% or more of the 3D glass ceramics tested survive drops from 150 centimeters (cm) or more, such as 155 cm or more, 160 cm or more, 165 cm or more, 170 cm or more, 175 cm or more, 180 cm or more, 185 cm or more, 190 cm or more, or 195 cm or more. An upper boundary of the test is 220 cm.

In embodiments, the 3D glass ceramic have a haze of less than or equal to 0.40%, such as less than or equal to 0.35%, less than or equal to 0.30%, less than or equal to 0.25%, less than or equal to 0.20%, less than or equal to 0.15%, less than or equal to 0.10%, and all ranges and subranges within these ranges. In embodiments, the haze is less than or equal to 0.15% and greater than or equal to 0.10%, less than or equal to 0.14% and greater than or equal to 0.10%, less than or equal to 0.13% and greater than or equal to 0.10%, less than or equal to 0.12% and greater than or equal to 0.10%, less than or equal to 0.11% and greater than or equal to 0.10%, and all ranges and subranges with these ranges. Haze was measured using standard BYK-Gardner haze-guard meter.

In addition, 3D glass ceramics formed according to methods disclosed and described herein have a birefringence that is similar to or an improvement on glass ceramics cerammed in a lehr. In embodiments, 3D glass ceramics have a birefringence that is less than 5.0 nm, such as less than or equal to 4.7 nm, less than or equal to 4.5 nm, less than or equal to 4.2 nm, less than or equal to 4.0 nm, less than or equal to 3.7 nm, less than or equal to 3.5 nm, less than or equal to 3.2 nm, less than or equal to 3.0 nm, less than or equal to 2.7 nm, less than or equal to 2.5 nm, and all ranges and subranges within these ranges. In embodiments, the 3D glass ceramics have a birefringence from greater than or equal to 2.5 nm to less than or equal to 4.5 nm, such as greater than or equal to 2.5 nm to less than or equal to 4.2 nm, greater than or equal to 2.5 nm to less than or equal to 4.0 nm, greater than or equal to 2.5 nm to less than or equal to 3.7 nm, greater than or equal to 2.5 nm to less than or equal to 3.5 nm, greater than or equal to 2.5 nm to less than or equal to 3.2 nm, greater than or equal to 2.5 nm to less than or equal to 3.0 nm, greater than or equal to 2.5 nm to less than or equal to 2.7 nm, and all ranges and subranges within these ranges. In embodiments, the 3D glass ceramics have a birefringence from greater than or equal to 2.7 nm to less than or equal to 4.5 nm, such as from greater than or equal to 3.0 nm to less than or equal to 4.5 nm, from greater than or equal to 3.2 nm to less than or equal to 4.5 nm, from greater than or equal to 3.5 nm to less than or equal to 4.5 nm, from greater than or equal to 3.7 nm to less than or equal to 4.5 nm, from greater than or equal to 4.0 nm to less than or equal to 4.5 nm, from greater than or equal to 4.2 nm to less than or equal to 4.5 nm, and all ranges and subranges within these ranges. Birefringence was measured in transmission using Stress Photonics GFP 1000 birefringence measurement system.

By using the above methods for forming 3D glass ceramic articles, the 3D glass ceramic articles may have dimensions that are very similar to the dimensions of the 3D article design, such as a CAD designed 3D article. The different between the as-formed 3D glass article and the designed 3D article may be referred to as dimension precision control and may be measured at any point by ±x mm. In embodiments a 3D glass ceramic article that has a thickness between 0.1 and 2 mm may have dimensional precision control less than or equal to ±0.1 mm, such as less than or equal to ±0.05 mm including all ranges and subranges within the foregoing ranges. Deviations from CAD were measured using ATOS GOM white light 3D scanning system, and data was analyzed using Rapidform XOR software to derive deviations to ideal CAD. The 3D ceramic glass article may also have a transmission of greater than or equal to 85% at wavelengths of light between 500 nm and 800 nm on a 1 mm thick sample wherein measurements are made at 1 nm wavelength increments and then averaged over the wavelength range, such as greater than or equal to 90% at wavelengths of light between 500 nm and 800 nm, or greater than or equal to 95% at wavelengths of light between 500 nm and 800 nm including all ranges and subranges within the foregoing ranges.

In addition to improved dimensional precision control, 3D glass ceramics made according to embodiments disclosed and described herein have a deviation in flatness of less than or equal to 0.10 nm, such as less than or equal to 0.07 nm, less than or equal to 0.05 nm, and all ranges and subranges with these ranges. In embodiments, 3D glass ceramics have a deviation in flatness from greater than or equal to 0.05 nm and less than or equal to 0.10 nm, such as from greater than or equal to 0.06 nm and less than or equal to 0.10 nm, from greater than or equal to 0.07 nm and less than or equal to 0.10 nm, from greater than or equal to 0.08 nm and less than or equal to 0.10 nm, from greater than or equal to 0.09 nm and less than or equal to 0.10 nm, and all ranges and subranges within these ranges. In embodiments, 3D glass ceramics have a deviation in flatness from greater than or equal to 0.05 nm and less than or equal to 0.09 nm, such as from greater than or equal to 0.05 nm and less than or equal to 0.08 nm, from greater than or equal to 0.05 nm and less than or equal to 0.07 nm, from greater than or equal to 0.05 nm and less than or equal to 0.06 nm, and all ranges and subranges within these ranges. Deviations to flatness were measured using ATOS GOM 3D scanning system, in the same way as the curve deviations to CAD.

EXAMPLES

Embodiments will be further clarified by the following examples.

Example 1

In Example 1, a glass sheet of glass with the composition as disclosed in Table 3 below having a thickness of 0.8 mm was nucleated for 2 hrs. at 600° C.

TABLE 3

| Oxide | Mol % |
|---|---|
| $SiO_2$ | 70.65 |
| $Al_2O_3$ | 4.20 |
| $Li_2O$ | 22.10 |
| $Na_2O$ | 0.00 |
| $K_2O$ | 0.00 |
| $P_2O_5$ | 0.90 |
| $ZrO_2$ | 2.00 |
| $TiO_2$ | 0.00 |
| MgO | 0 |
| $SnO_2$ | 0.15 |
| $B_2O_3$ | 0.00 |

The nucleated glass was cooled to room temperature from 600° C., and then placed on a graphite mold and heated to maximum temperature of 755° C., which corresponds to the crystal growth temperature for this composition. The glass was held at 755° C. for 300 seconds with 0.5 MPa pressure and then slow cooled while maintaining the same pressure in initial stages of cooling. The total cycle to 3D form the nucleated glass was 45 minutes, including heating from room temperature and cooling back to room temperature. The resulting glass ceramic 3D article formed according to Example 1 had the following crystal phase assemblage and visually was optically clear (in wt %):

| Glass | $Li_2Si_2O_5$ | Petalite | $Li_2SiO_3$ |
|---|---|---|---|
| 31.0% | 26.0% | 37.0% | 5.4% |

Figure 3B:
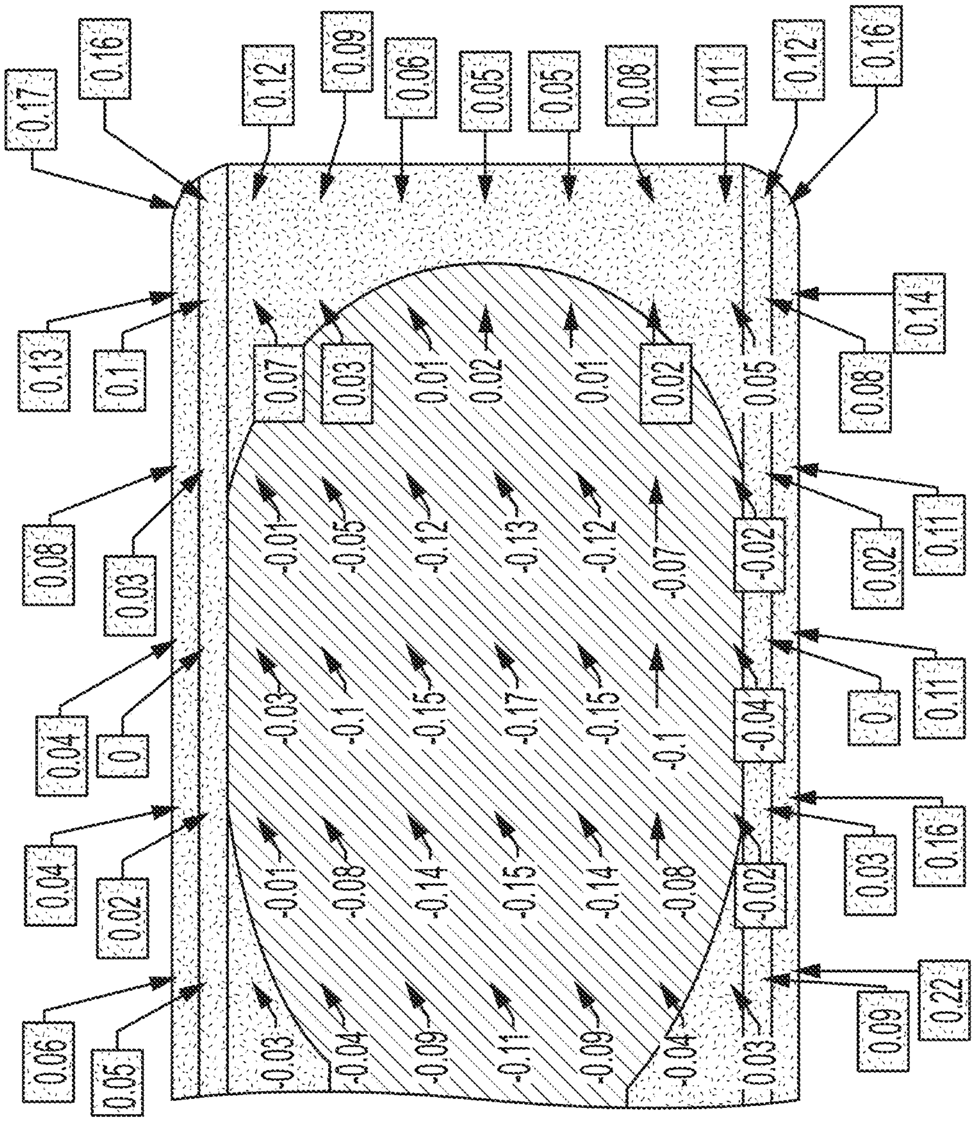
FIG. 3B is a schematic depicting the deviation of an as-formed 3D glass ceramic article to the computer aided design (CAD) designed article according to embodiments disclosed and described herein.
Figure 3A:
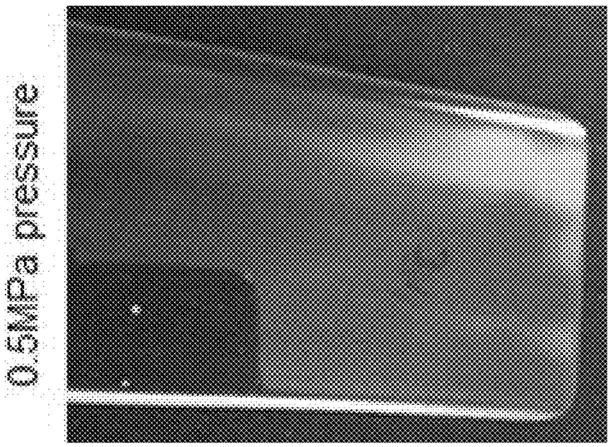
FIG. 3A is a photograph of a 3D glass ceramic article according to embodiments disclosed and described herein.

A photograph of the 3D glass ceramic article produced in Example 1 is shown in FIG. 3A. The shape of the 3D glass ceramic article formed in Example 1 is compared to the designed article (which was designed using conventional computer aided design (CAD) software) is shown on FIG. 3B. As can be seen in FIG. 3B, the parameters of the as-formed 3D glass ceramic article and the CAD designed 3D articles were similar such that a dimensional precision control is less than or equal to ±0.1 mm.

Example 2

Figure 4:
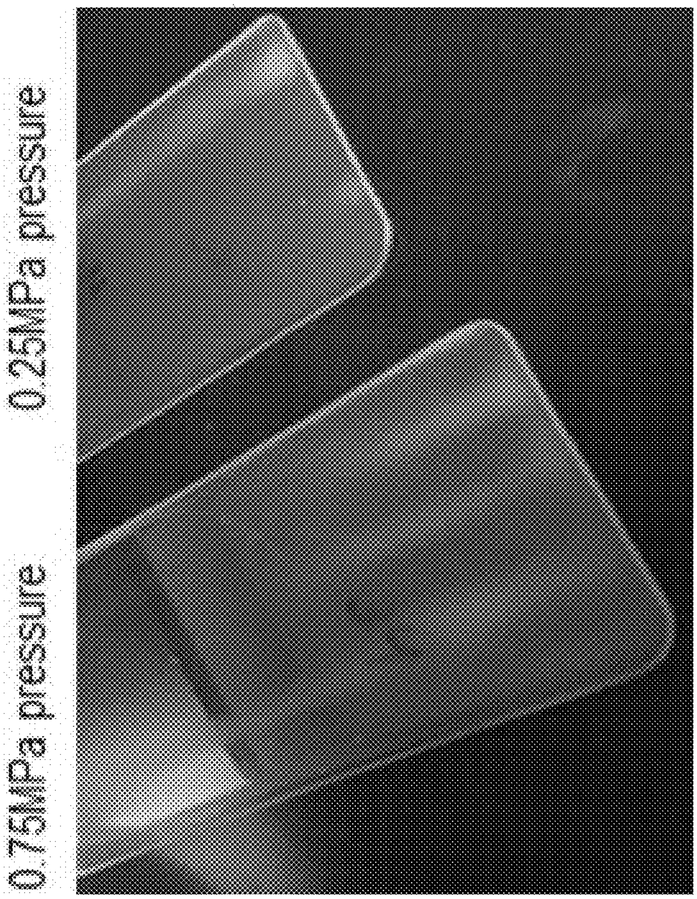
FIG. 4 is a photograph of 3D glass ceramic articles according to embodiments disclosed and described herein.

Two additional 3D glass ceramic articles were produced according to the process disclosed above for Example 1, except that for one 3D glass ceramic article 0.25 MPa of pressure was applied and for the other 3D glass ceramic article 0.75 MPa of pressure was applied. FIG. 4 shows the resultant 3D glass ceramic articles with the 3D glass ceramic article formed with 0.75 MPa pressure on the left in FIG. 4 and the 3D glass ceramic article formed with 0.25 MPa pressure on the right in FIG. 4. As shown in FIG. 4, the 3D glass ceramic articles had a slightly hazy appearance indicative of pressure contributing to crystal phase assemblage. However, the grayish press marks are easily removed by polishing off about 5 um from the glass ceramic article surface.

Example 3

Nucleated glass was formed of from glass having the composition in Table 1 above and a thickness of 0.8 mm and nucleating for 2 hrs. at 600° C. The nucleated glass was cooled to room temperature from 600° C., and then placed on graphite mold and heated to maximum temperature of 650° C. and pressed with 0.25 MPa pressure for 135 seconds. The glass was then heated to temperature of 755° C. and pressed with 0.21 MPa pressure for 45 min. The corresponding crystal phase assemblage for transparent 3D glass ceramic article made using this process was (in wt %):

| Glass | $Li_2Si_2O_5$ | Petalite | $Li_2SiO_3$ |
|---|---|---|---|
| 13.0% | 38.0% | 47.0% | 2.6% |

Comparative Examples 1-3

Figure 5A:
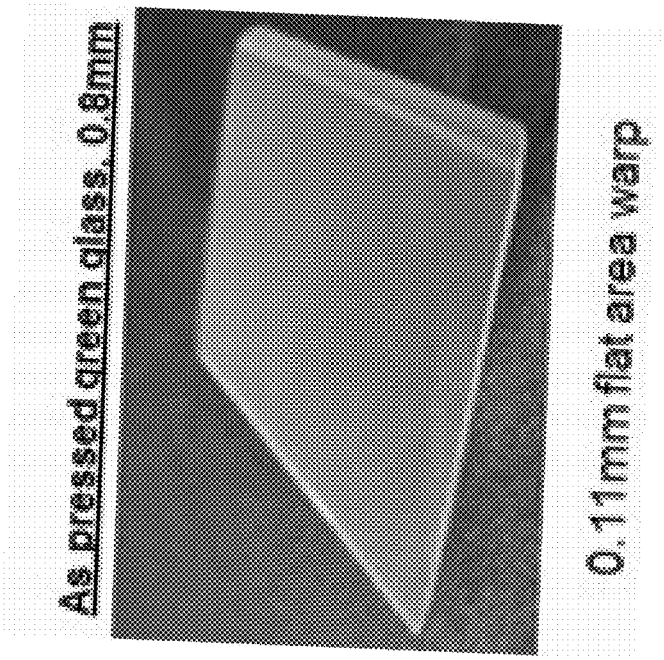
FIG. 5A is a photograph of a 3D glass ceramic article.
Figure 5B:
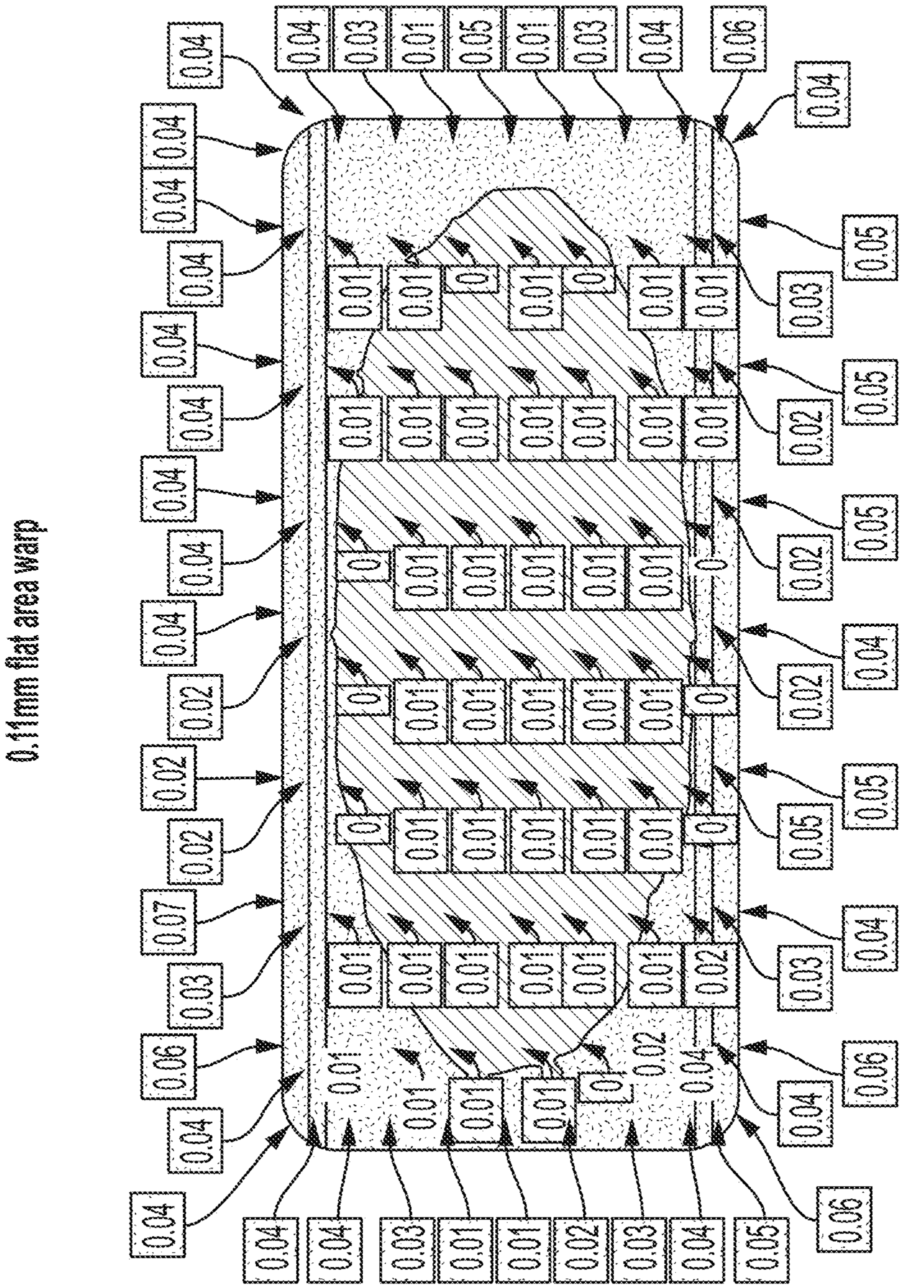
FIG. 5B is a schematic depicting the deviation of an as-formed 3D glass ceramic article to the CAD designed article.

Comparative examples were made of glass having the composition and thickness in Example 1. The first comparative example was pressed without first being nucleated and is shown in FIG. 5A, which is a photograph of the formed 3D article. FIG. 5B shows a comparison of the dimensions of the as-formed 3D article to the CAD designed article. This comparative example had a dimensional precision control that was greater than ±0.1 mm.

Figure 6A:
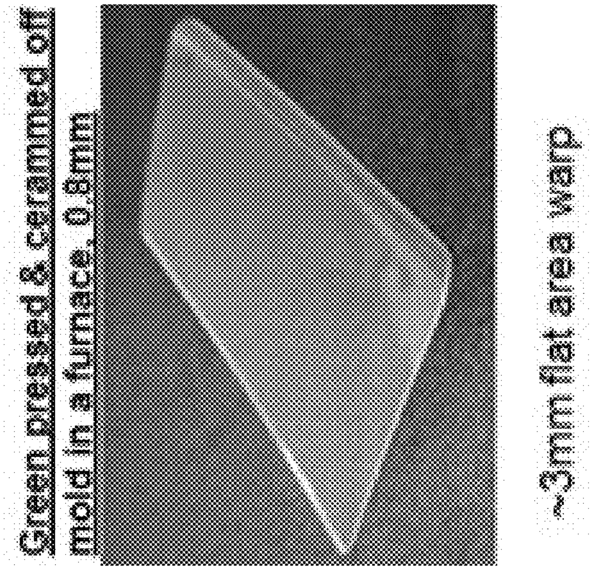
FIG. 6A is a photograph of a 3D glass ceramic article.
Figure 6B:
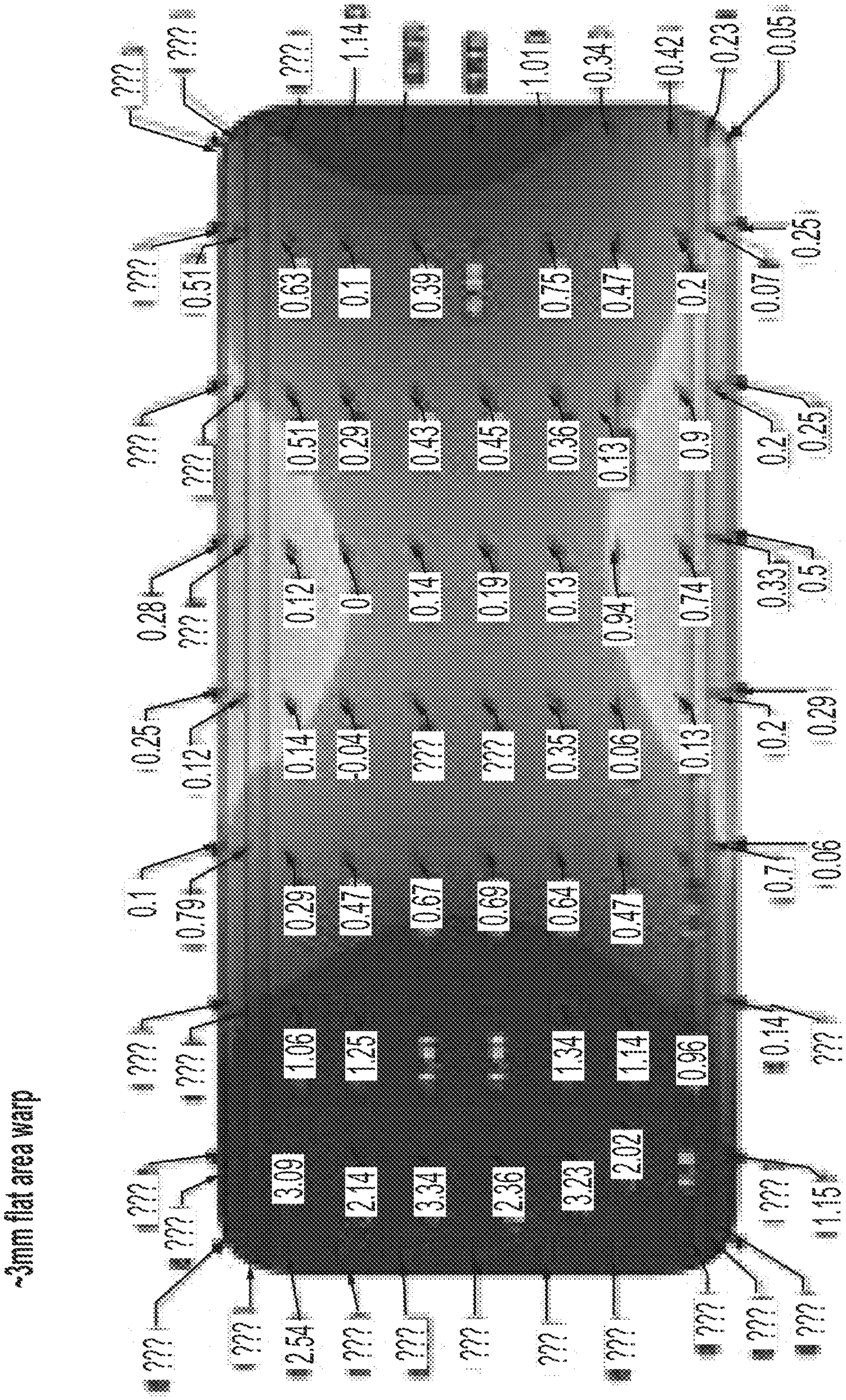
FIG. 6B is a schematic depicting the deviation of an as-formed 3D glass ceramic article to the CAD designed article.

In a second comparative example, green glass with the above composition and having a 0.8 mm thickness was pressed with 0.25 MPa pressure for 90 seconds at maximum pressing temperature of 600° C. This process did not substantively nucleate the glass. The 3D shaped glass article was then cerammed (nucleated and crystallized) in a furnace using a heat treatment cycle at 570° C. for 4 hrs. followed by 740° C. for 1 hr. The 3D ceramic glass article formed according to the second comparative example is shown in FIG. 6A, and a comparison of the dimensions of the as-formed 3D glass ceramic article to the CAD designed article is shown in FIG. 6B. As shown in FIG. 6A and FIG. 6B had a distorted shape during the ceram cycle due to material densification. This comparative example had a dimensional precision control that was greater than ±0.1 mm.

Figure 7A:
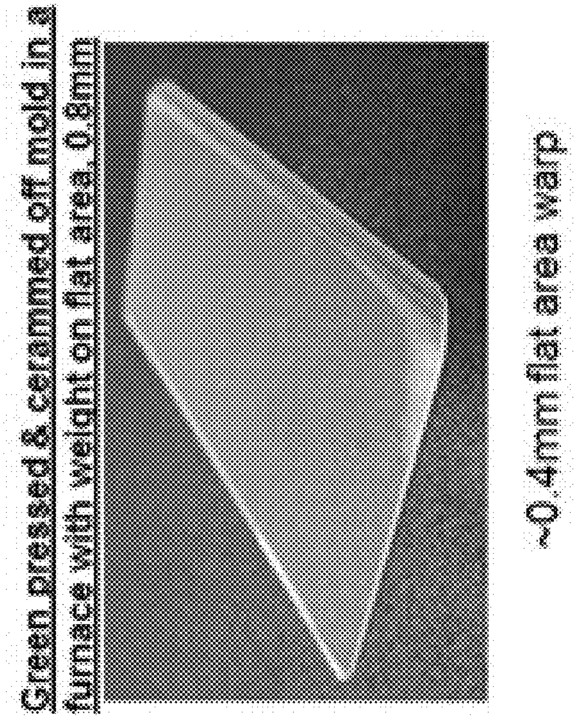
FIG. 7A is a photograph of a 3D glass ceramic article.
Figure 7B:
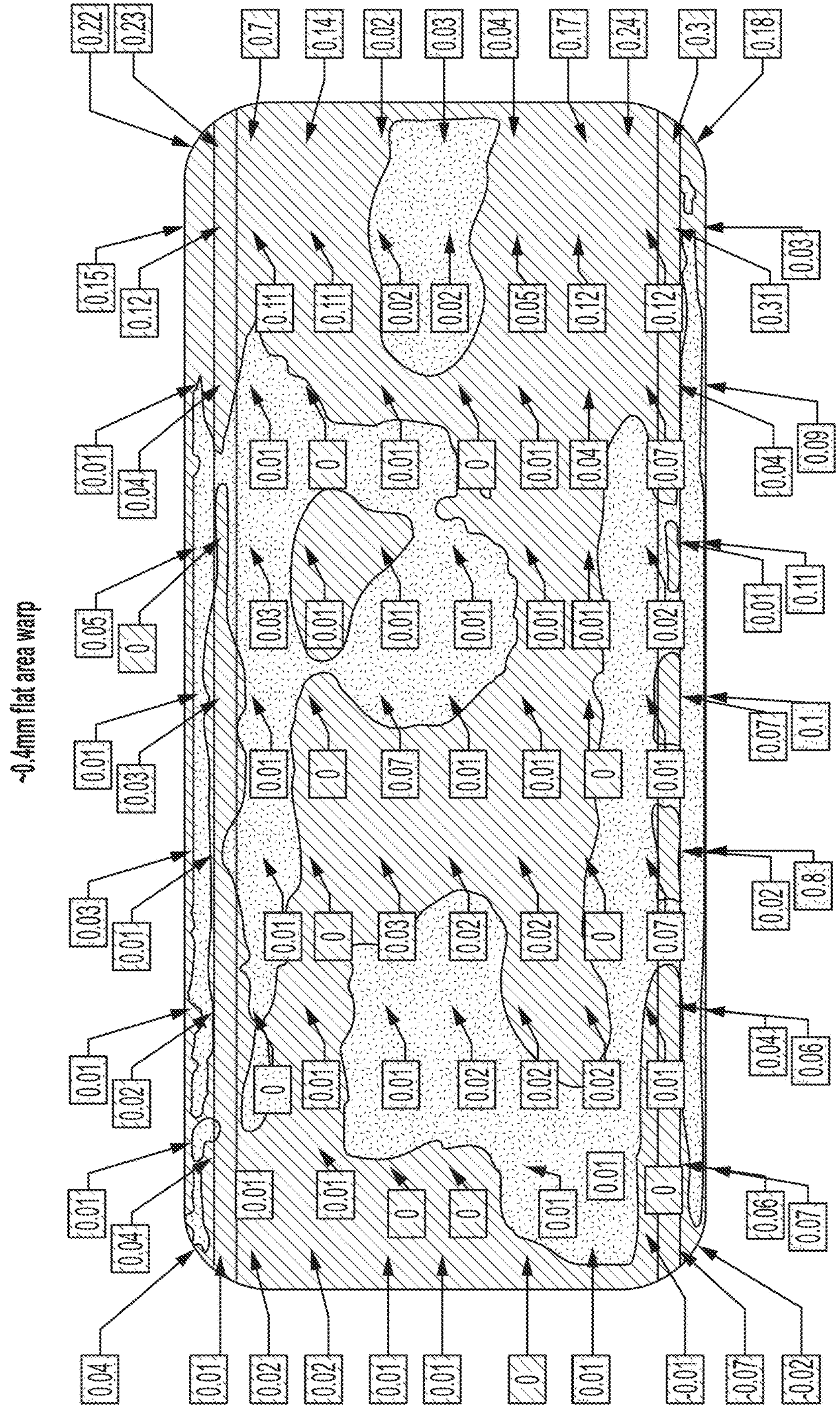
FIG. 7B is a schematic depicting the deviation of an as-formed 3D glass ceramic article to the CAD designed article.

A third comparative example was made in the same manner as the second comparative example, except that a weight was added to the 3D glass article during the ceramming process. The 3D ceramic glass article formed according to the third comparative example is shown in FIG. 7A, and a comparison of the dimensions of the as-formed 3D glass ceramic article to the CAD designed article is shown in FIG. 7B. As shown in FIG. 7A and FIG. 7B the portion of the article with the load on the flat area was able to maintain the shape during the ceram cycle. This comparative example had a dimensional precision control that was greater than ±0.1 mm.

Example 4

Figure 8:
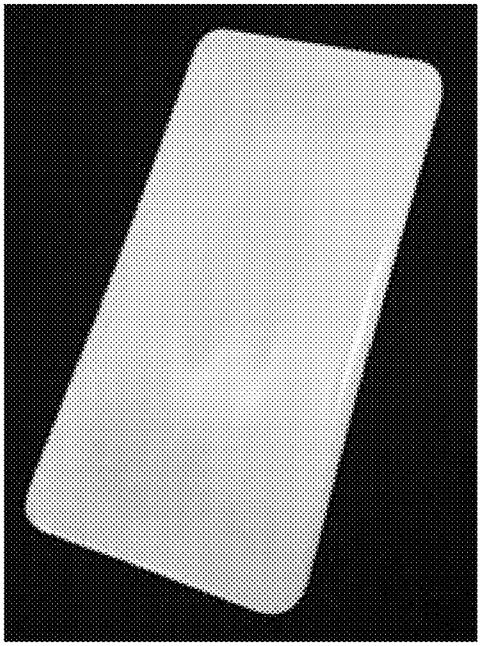
FIG. 8 is a photograph of a 3D glass ceramic article according to embodiments disclosed and described herein.

Examples of green glass 3D formed article made using glass with a composition as disclosed in Table 1 that was nucleated and crystallized in the 3D forming process to produce the white color as shown in FIG. 8. The green glass was placed on 3D mold and pressed at maximum pressing temperature of 750° C. for 300 seconds at 0.25 MPa pressure. Increasing the pressure to 0.75 MPa with the same time and temperature produced a more opaque white color. The total 3D forming time for both examples was about 45 min.

Example 5

The pressing is occurring in a press with 11 modules, the mold is in each module for the time shown in the table. All of the examples below are for glass having a composition as disclosed in Table 1 nucleated at 600° C. for 2 hrs. This example shows that it is possible to target certain crystalline phases using methods according to embodiments as shown in Table 4 below:

TABLE 4

| Sample | Pressing temp (C.) | Pressure (Mpa) | Pressing index time (sec) | Li disilicate $Li_2Si_2O_5$ | Petalite | Li metasilicate $Li_2SiO_3$ | Virgilite |
|---|---|---|---|---|---|---|---|
| 1 | 775 | 0.9 | 250 | 38 | 45 | 3.1 | — |
| 2 | 775 | 0.9 | 125 | 33 | 44 | 4.3 | — |
| 3 | 785 | 0.9 | 150 | 37 | 44 | 3.3 | — |
| 4 | 800 | 0.9 | 150 | 41 | 44 | 1.6 | — |
| 5 | 800 | 0.9 | 250 | 42 | 42 | — | 1.2 |

Figure 9:
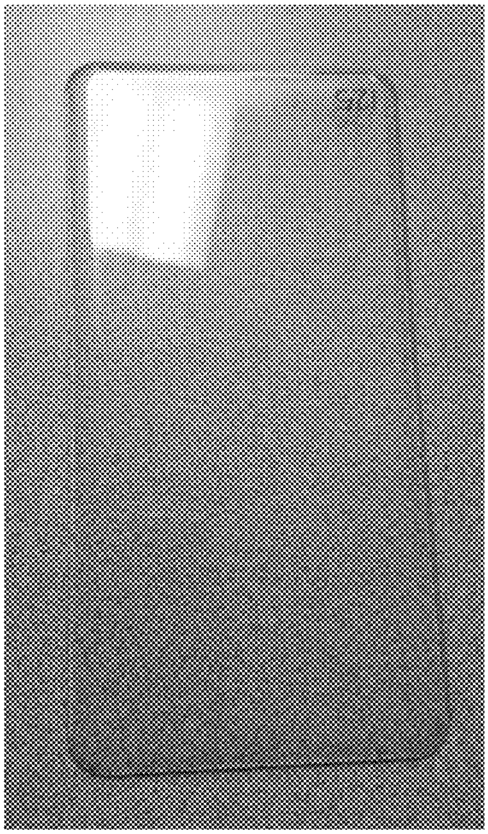
FIG. 9 is a photograph of a 3D glass ceramic article according to embodiments disclosed and described herein.

A photograph of a glass produced according to this example is shown in FIG. 9

Example 6

3D glass ceramic articles were formed from a precursor glass composition as shown in the table below:

| mol % oxide | Mol % |
|---|---|
| $SiO_2$ | 70.65 |
| $Al_2O_3$ | 4.20 |
| $Li_2O$ | 22.10 |
| $Na_2O$ | 0.00 |
| $K_2O$ | 0.00 |
| $P_2O_5$ | 0.90 |
| $ZrO_2$ | 2.00 |
| $SnO_2$ | 0.15 |
| $B_2O_3$ | 0.00 |
| $Li_2O/R_2O$ | 1.00 |
| $R_2O/A_l2O_3$ | 5.26 |

The glass was nucleated by heating at a heating rate of 5° C./min with a 2 hour nucleation time. The cooling rate was 5° C./min. Subsequently, the nucleated glass was placed in a mold and cerammed. The forming process setpoints in the mold pressing machine are shown in the table below. Cycle time in each module was 150 seconds.

| | Preheat | Preheat | Preheat | Preheat | Press 1 | Press 2 | Press 3 | Cooling | Cooling |
|---|---|---|---|---|---|---|---|---|---|
| New Temp (° C.) | 560 | 600 | 650 | 720 | 800 | 785 | 650 | 525 | 450 |
| Pressure (MPa) | | | | | 0.9 | 0.9 | 0.9 | 0.9 | |

Figure 10:
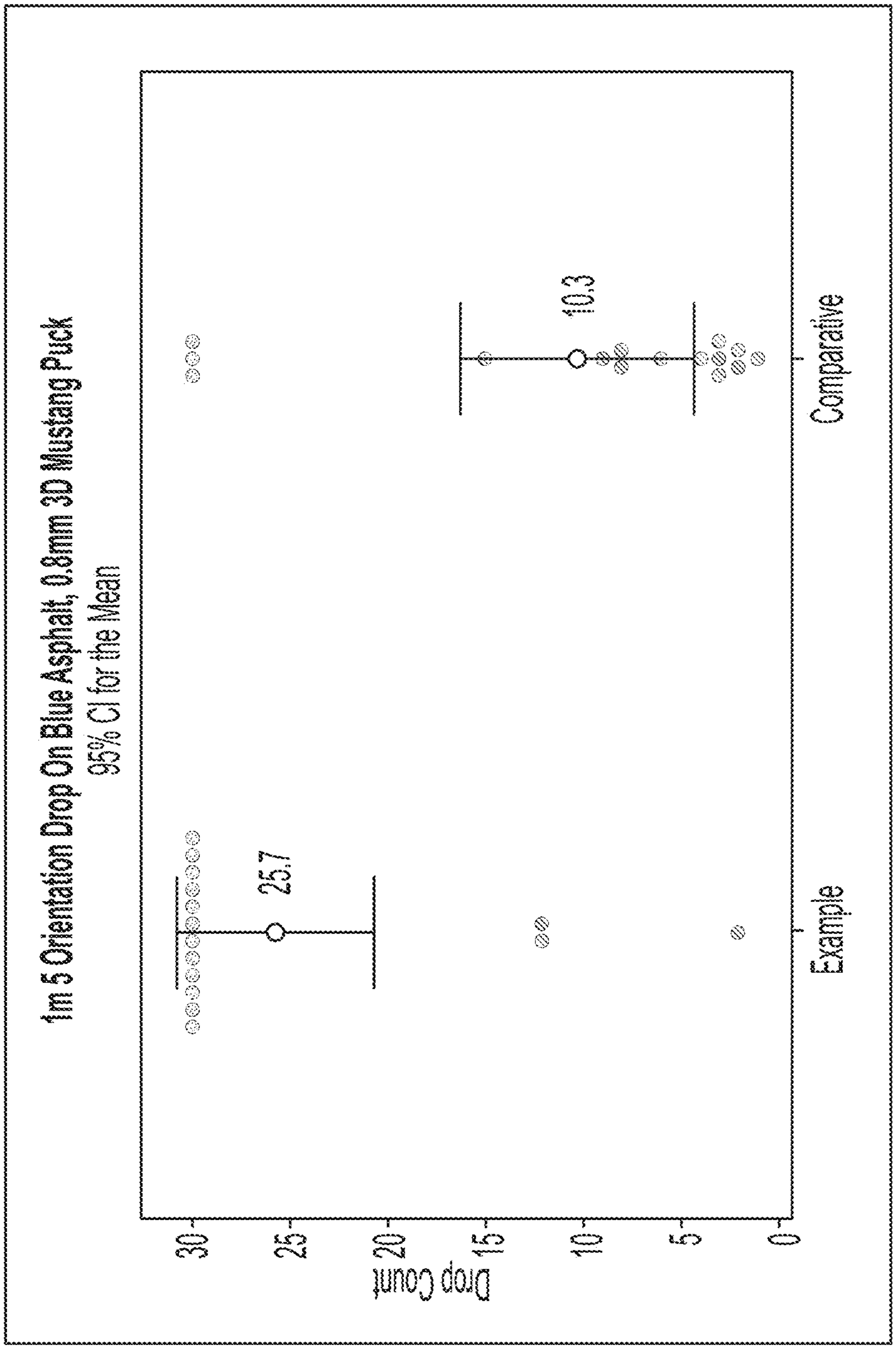
FIG. 10 is a graph showing the results of drop tests onto asphalt according to embodiments disclosed and described herein.

After ceramming, the 3D glass ceramic article was chemically strengthened by placing the 3D glass ceramic article in a molten salt bath comprising 60.0 wt % $KNO_3$, 40.0 wt % $NaNO_3$, 0.1 wt % $LiNO_3$, 0.5 wt % $NaNO_2$, and 0.5 wt % silicic acid (where $LiNO_3$, $NaNO_2$, and silicic acid are added as superadditions) was heated to a temperature of 500° C. for a duration of five hours. The strengthened 3D glass ceramic article was then dropped from a height of 1 meter onto an asphalt surface. The drop was repeated until the glass ceramic part failed (such as by breaking). The number of drops (drop count) before failure by breaking was measured. FIG. 10 shows the results of the above drop test, where an average of 25.7 drops were performed before damage visible by the naked eye was observed.

As a comparison, glass ceramics prepared using a precursor glass composition as described in the table below on an oxide basis and then ceramming the molded glass in a lehr were subjected to the drop test disclosed above, and an average of 10.3 drops were performed until the glass was broken. Thus, these tests show the improved durability of 3D glass ceramics formed according to embodiments disclosed and described herein.

| Oxide | Mol % |
|---|---|
| $Al_2O_3$ | 17.83 |
| $B_2O_3$ | 6.11 |
| MgO | 4.41 |
| $Na_2O$ | 1.73 |

-continued

| Oxide | Mol % |
|---|---|
| $SiO_2$ | 58.39 |
| $SnO_2$ | 0.08 |
| $K_2O$ | 0.18 |
| $Fe_2O_3$ | 0.02 |
| CaO | 0.58 |
| $Li_2O$ | 10.66 |
| SrO | 0.00 |
| ZnO | 0.00 |
| $P_2O_5$ | 0.00 |

Example 7

3D glass ceramic articles were formed from a precursor glass composition, on an oxide basis, as shown in the table below.

| Oxide | Mol % |
|---|---|
| $SiO_2$ | 70.65 |
| $Al_2O_3$ | 4.20 |
| $Li_2O$ | 22.10 |
| $Na_2O$ | 0.00 |
| $K_2O$ | 0.00 |

-continued

| Oxide | Mol % |
|---|---|
| $P_2O_5$ | 0.90 |
| $ZrO_2$ | 2.00 |
| $SnO_2$ | 0.15 |
| $B_2O_3$ | 0.00 |
| $Li_2O/R_2O$ | 1.00 |
| $R_2O/Al_2O_3$ | 5.26 |

Figure 11:
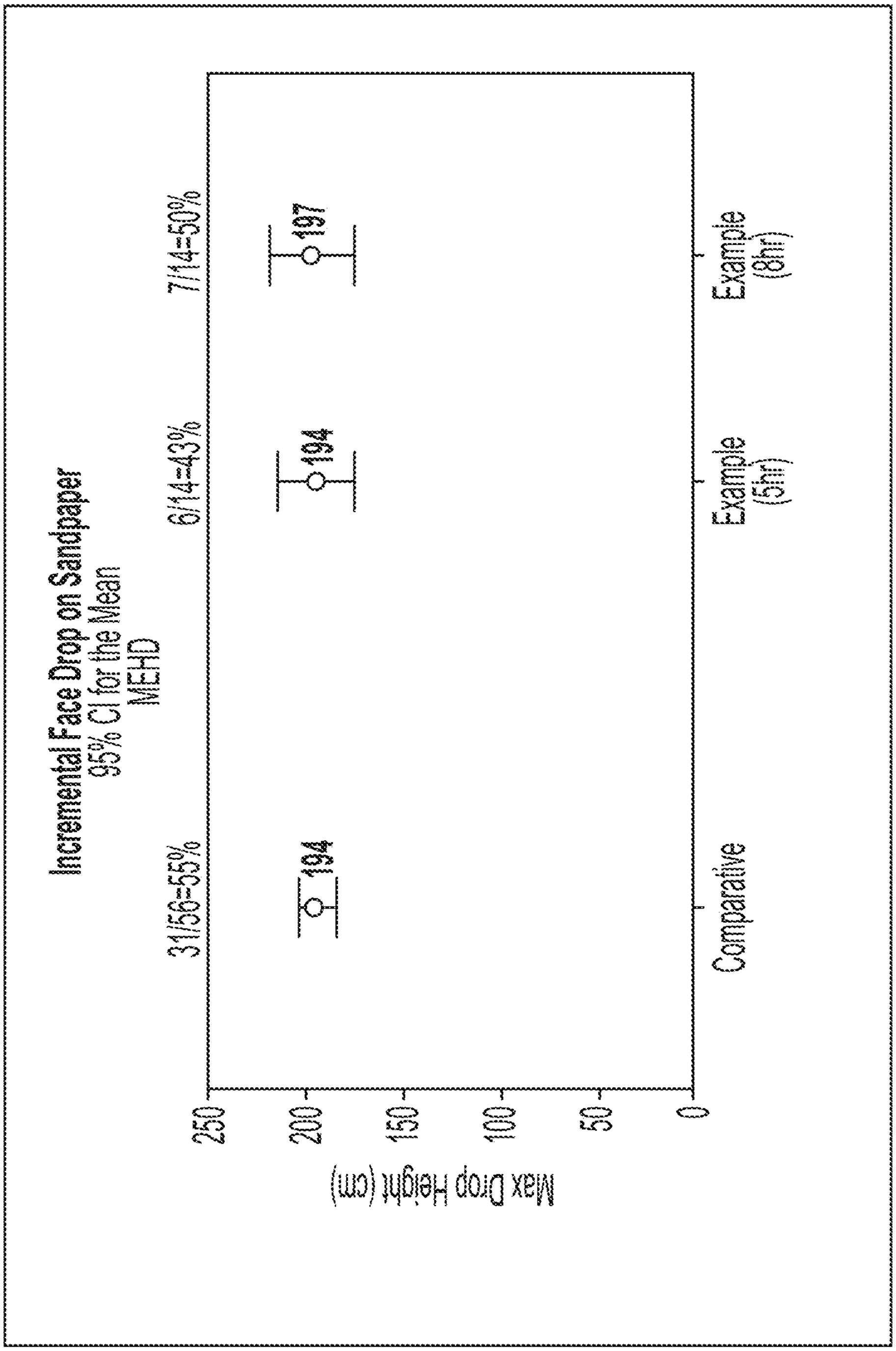
FIG. 11 is a graph showing the results of drop tests onto 80 grit sandpaper according to embodiments disclosed and described herein.

The glass was nucleated and cerammed as described above in Example 6. After ceramming, the 3D glass ceramic article was chemically strengthened by placing the 3D glass ceramic article in a molten salt bath comprising 60.0 wt % $KNO_3$, 40.0 wt % $NaNO_3$, 0.1 wt % $LiNO_3$, 0.5 wt % $NaNO_2$, and 0.5 wt % silicic acid (where $LiNO_3$, $NaNO_2$, and silicic acid are superadditions) that was heated to a temperature of 500° C. for a duration of five hours. The strengthened 3D glass ceramic article was then dropped on a broad surface from increasing heights starting at 30 cm in increments of 10 cm onto 80 grit sandpaper until the glass failed by breaking. The height of the drop where the glass broke was reported. FIG. 11 shows the results of the above drop test, where an average height of 194 cm was attained before the glass broke.

The above test was repeated, but the duration of the chemical strengthening was increased to 8 hours. In this test, and as shown in FIG. 11, an average height of 197 cm was attained before damage visible by the naked eye was observed.

As a comparison, similar glass ceramics prepared by ceramming molded glass in a lehr at 570° C. for 4 hours and 740° C. for 1 hour were subjected to the drop test disclosed above, and an average height of 194 cm was attained before damage visible by the naked eye was observed. Thus, these tests show that the durability of glass ceramics formed according to embodiments disclosed and described herein is as good or better than glass ceramics that are cerammed in a lehr.

Example 8

3D glass ceramic articles having a thickness of 0.8 mm were formed from a glass composition as described in Example 7. The glass was nucleated and cerammed as described above in Example 6. After ceramming, the 3D glass ceramic article was chemically strengthened by placing the 3D glass ceramic article in a molten salt bath comprising 60.0 wt % $KNO_3$, 40.0 wt % $NaNO_3$, 0.1 wt % $LiNO_3$, 0.5 wt % $NaNO_2$, and 0.5 wt % silicic acid (where the $LiNO_3$, $NaNO_2$, and silicic acid are added as superadditions). The duration of the chemical strengthening varied as shown in the table below, which also shows the compressive stress (CS), central tension (CT), and depth of compression (DOC) of the 3D glass ceramic:

| | Duration (hrs.) | CS (MPa) | CT (MPa) | DOC (μm) |
|---|---|---|---|---|
| C. Ex. 4 | 8 | 338 | 106 | 181 |
| Ex. 1 | 5 | 362 | 106 | TBD |
| Ex. 2 | 8 | 345 | 123 | TBD |

As shown in the above table, the 3D glass ceramic of Example 1, which was formed according to embodiments disclosed and described herein, had better CS and the same CT as Comparative Example 1, even though it was exposed to the ion exchange bath for less time than Comparative Example 1. Likewise, the 3D glass ceramic of Example 2, which was formed according to embodiments disclosed and described herein, a better CS and a better CT as Comparative Example 1, when exposed to the ion exchange bath for the same duration as Comparative Example 1.

Example 9

Figure 12A:
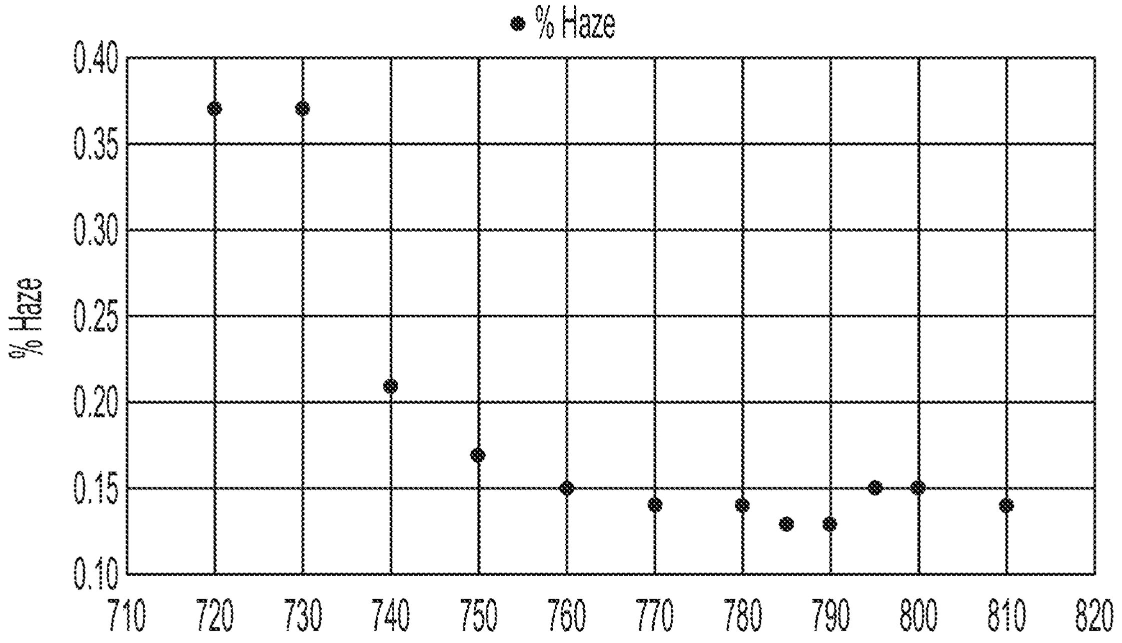
FIGS. 12A-12C are graphs showing the haze, deviation in flatness, dimension precision control, and birefringence of 3D glass ceramics pressed for 150 seconds as function of pressing temperature according to embodiments disclosed and described herein.
Figure 12B:
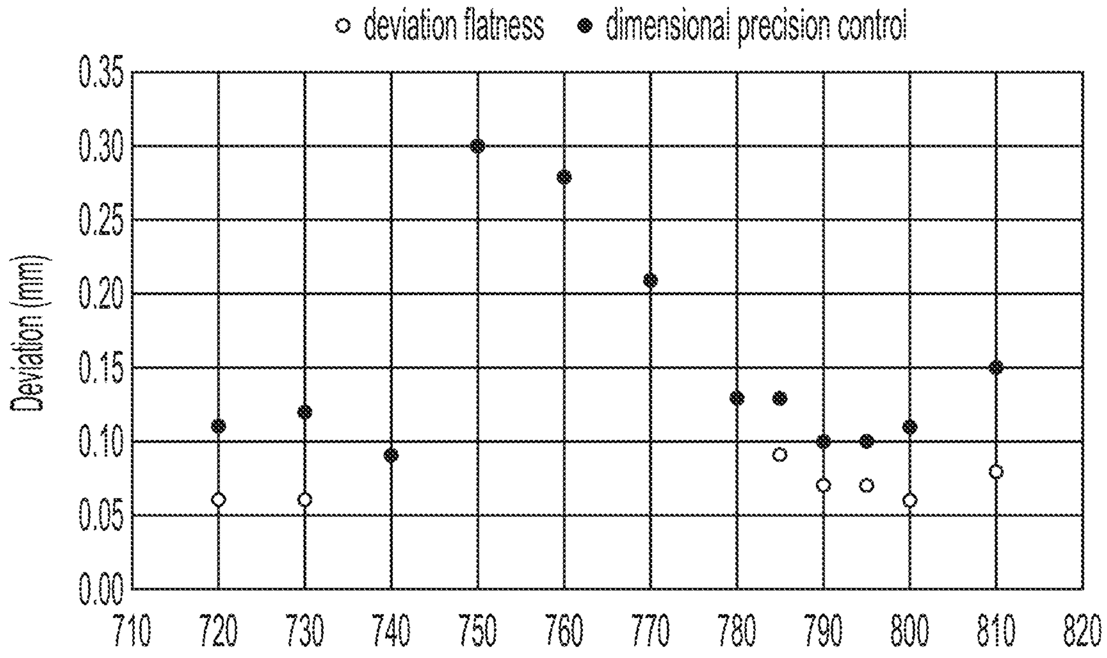
Figure 12C:
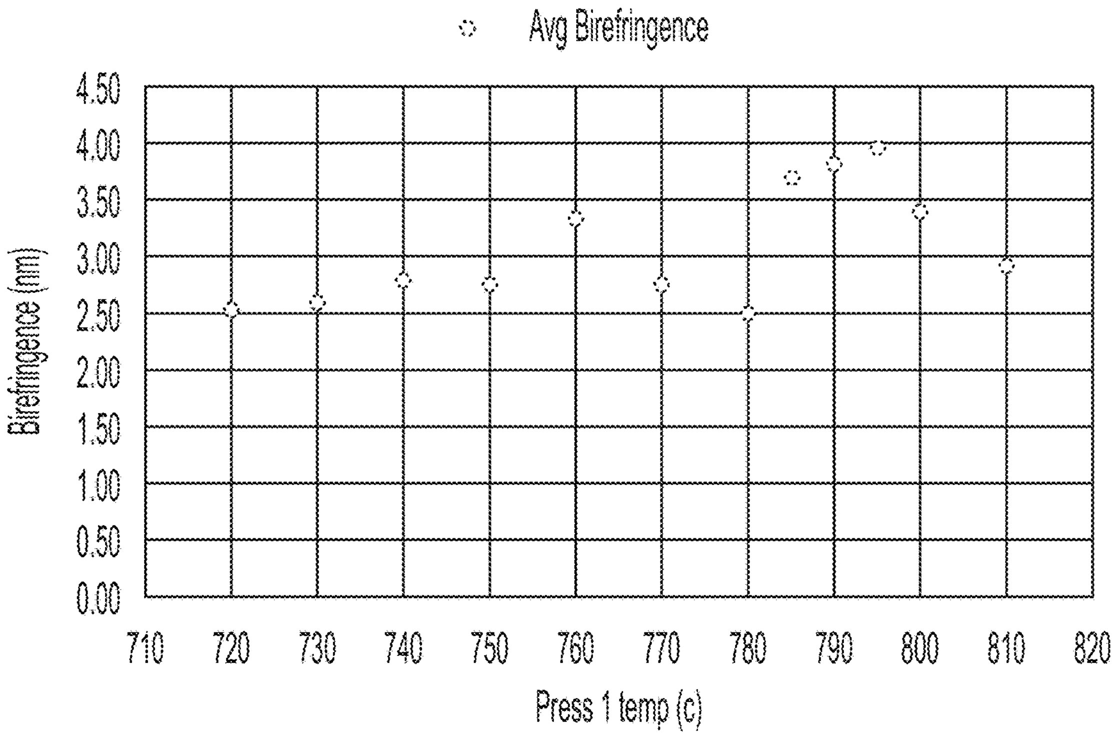

3D glass ceramic articles were formed from a glass composition as described above in Example 7. The glass was nucleated and cerammed as described above in Example 6. Subsequently, the nucleated glass was placed in a mold and pressed at different temperatures for 150 seconds. The haze, deviation of flatness, dimension precision control, and birefringence were measured. As shown in FIGS. 12A-12C, the haze (FIG. 12A), deviation in flatness (FIG. 12B), dimension precision control (FIG. 12B), and birefringence (FIG. 12C) all showed acceptable values at temperatures around 800° C.

Figure 13A:
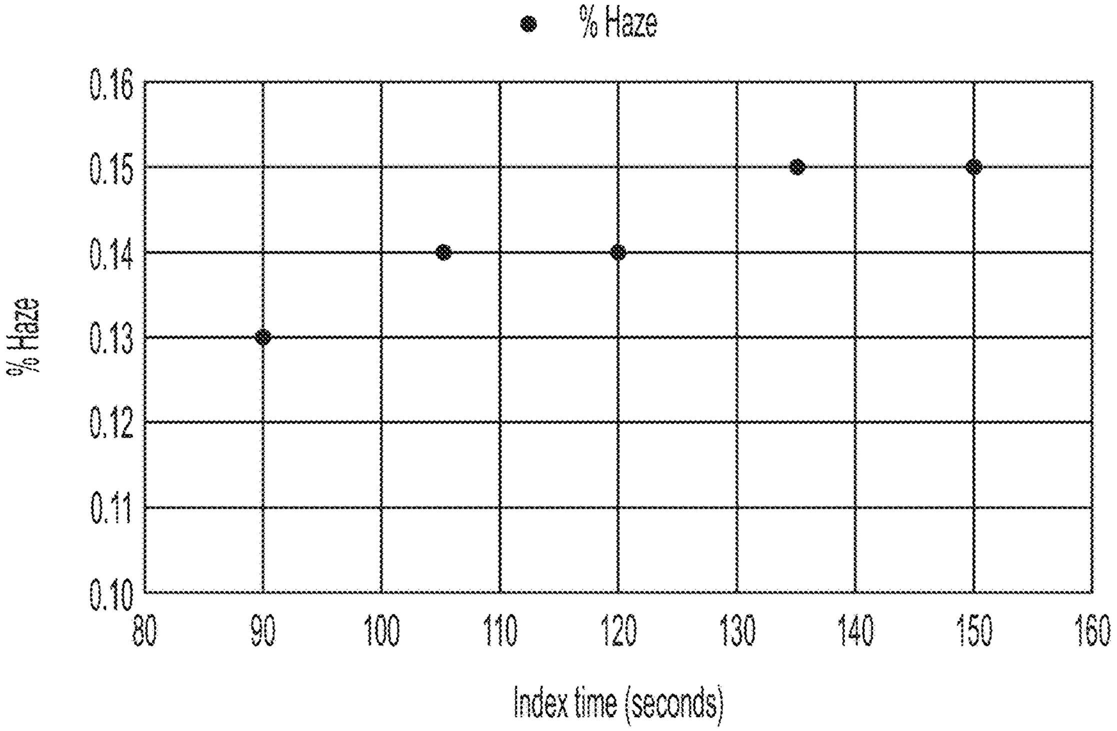
FIGS. 13A-13C are graphs showing the haze, deviation in flatness, dimension precision control, and birefringence of 3D glass ceramics pressed at a temperature of 800° C. as function of pressing time according to embodiments disclosed and described herein.
Figure 13B:
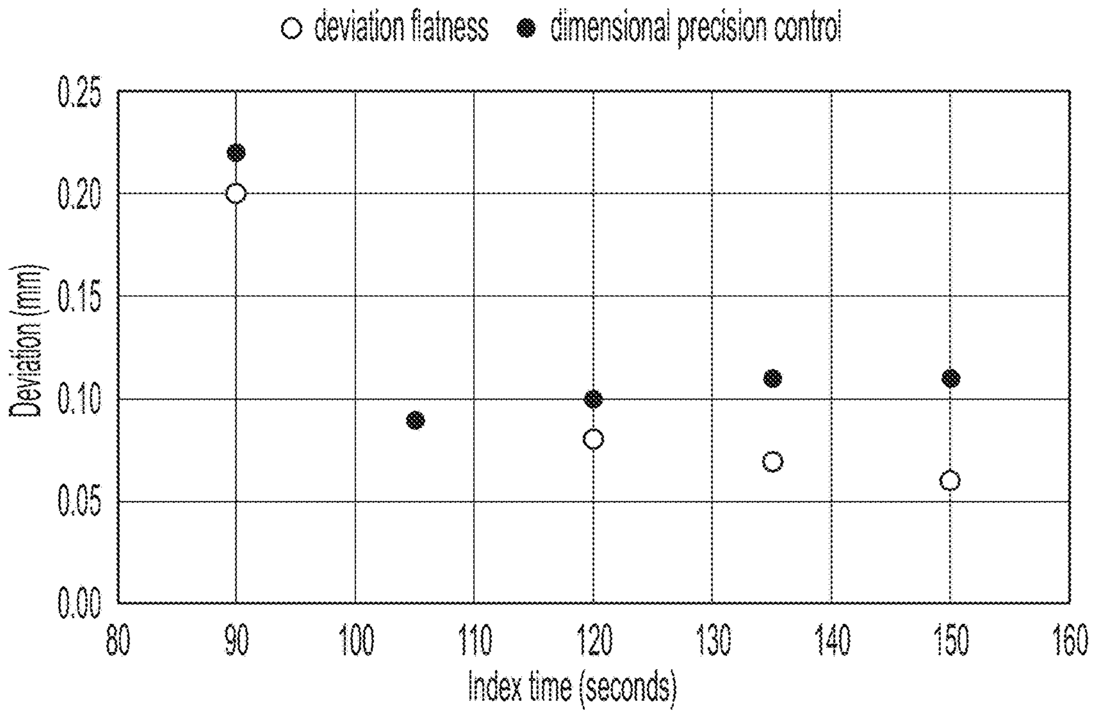
Figure 13C:
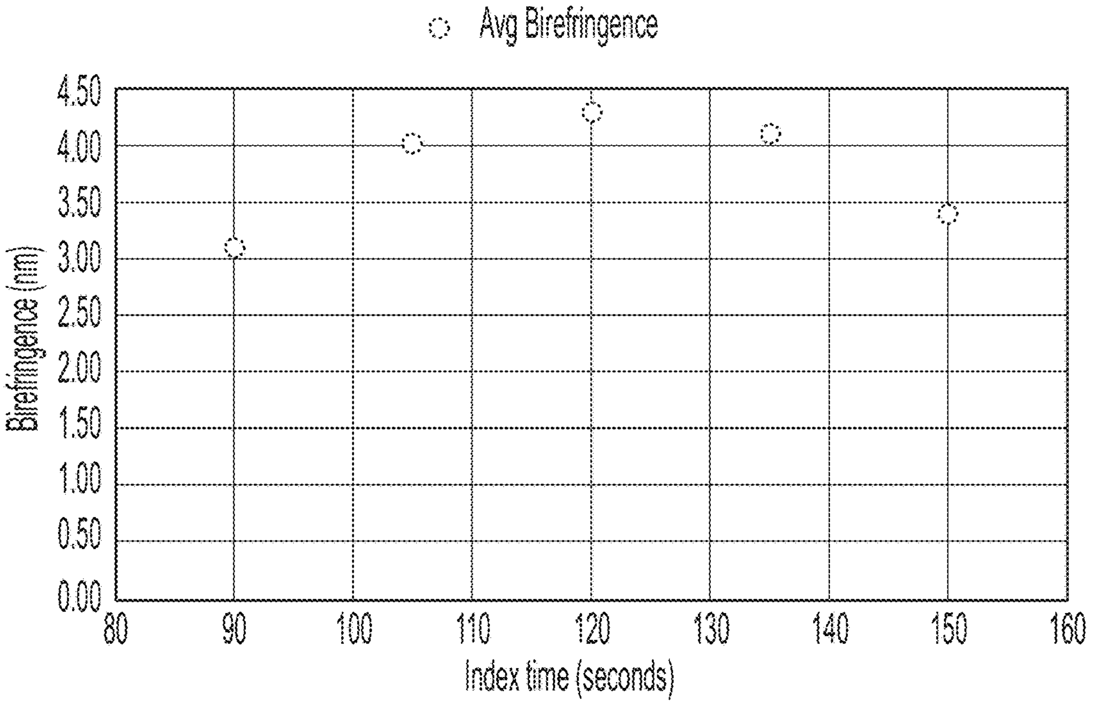
Figure 14A:
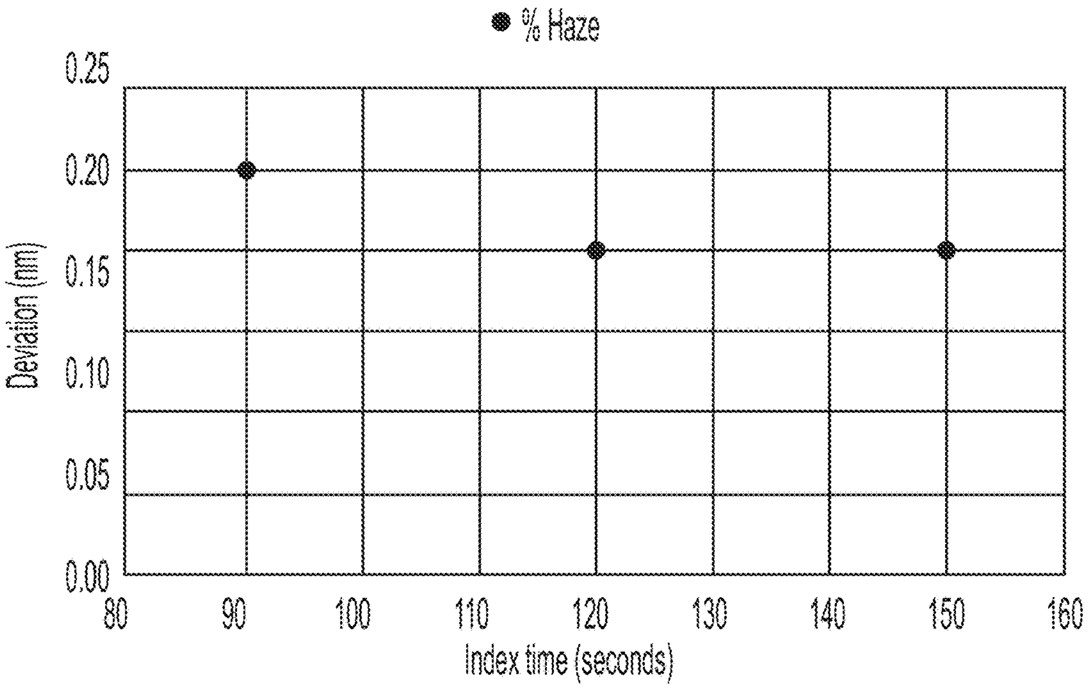
FIGS. 14A-14C are graphs showing the haze, deviation in flatness, dimension precision control, and birefringence of 3D glass ceramics pressed at a temperature of 810° C. as function of pressing time according to embodiments disclosed and described herein.
Figure 14B:
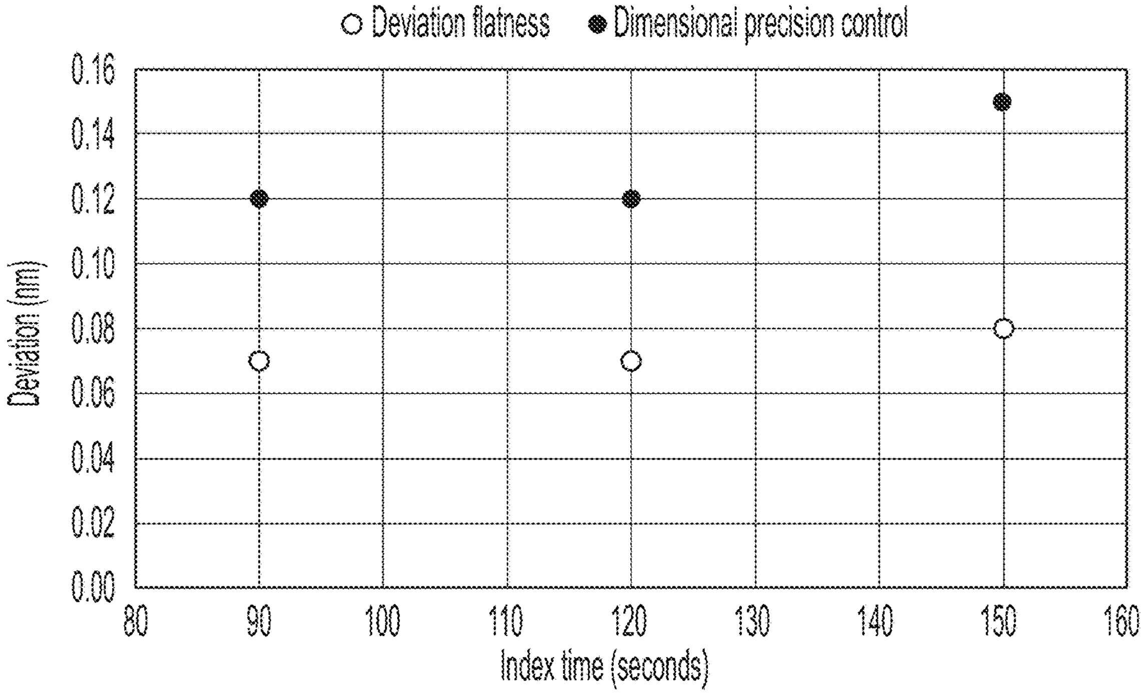
Figure 14C:
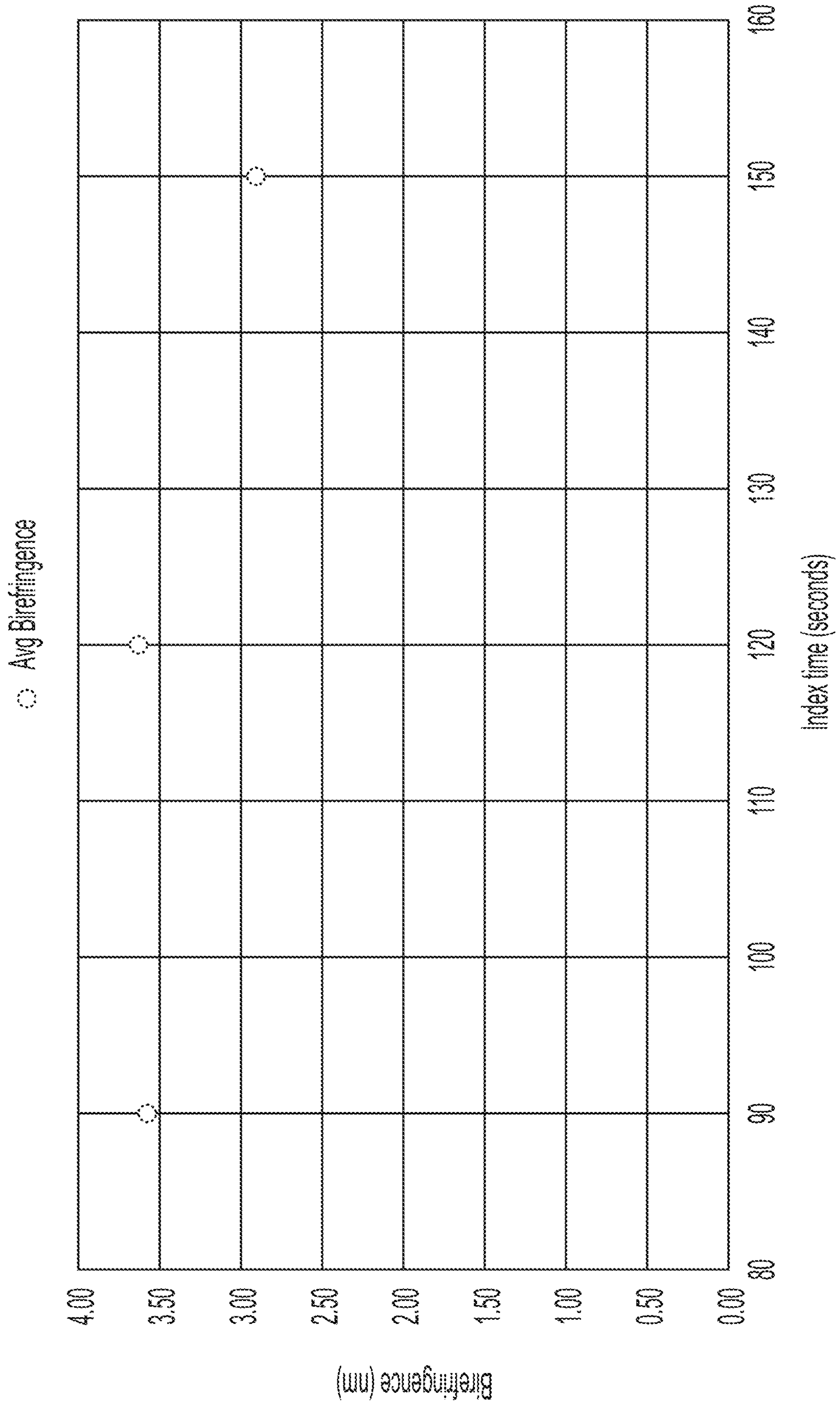

From this, tests were conducted by pressing of 3D glass ceramics at pressing temperatures of 800° C. and 810° C. and varying the time of pressing from about 80 seconds to about 160 seconds. Results from these tests are shown in FIGS. 13A-13C for the 800° C. tests and 14A-14C for 810° C. tests.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method for forming a three dimensional glass ceramic article comprising:

placing an amorphous glass article cooled to room temperature into a mold;

heating the amorphous glass article to a nucleation temperature, wherein the amorphous glass article is in the mold during the heating;

holding the amorphous glass article at the nucleation temperature for a duration sufficient to nucleate the amorphous glass article and form a nucleated three dimensional glass article, wherein the amorphous glass article is in the mold during the holding, wherein the method further comprises cooling the nucleated three dimensional glass article after holding at the nucleation temperature for a duration; and removing the nucleated and cooled three dimensional glass article from the mold prior to crystal growth.

2. The method of claim 1, wherein the nucleation temperature is from greater than or equal to 450° C. to less than or equal to 750° C.

3. The method of claim 1, wherein the duration sufficient to nucleate the amorphous glass article and form a nucleated three dimensional glass article is from greater than or equal to 1.0 hours to less than or equal to 4.0 hours.

4. The method of claim 1, wherein a pressure is applied to the amorphous glass article during at least a portion of the heating or the holding steps, and the pressure is from greater than or equal to 0.10 MPa to less than or equal to 1.00 MPa.

5. The method of claim 1, wherein the method further comprises crystallizing the nucleated three dimensional glass article after the nucleated three dimensional glass article is removed from the mold.

6. The method of claim 5, wherein the method further comprises lapping and/or polishing the nucleated three dimensional glass article prior to crystallizing the nucleated three dimensional glass article.

* * * * *